United States Patent
Hirai et al.

(10) Patent No.: US 10,440,277 B2
(45) Date of Patent: Oct. 8, 2019

(54) IMAGE PROCESSING DEVICE, ELECTRONIC EQUIPMENT, IMAGE PROCESSING METHOD AND NON-TRANSITORY COMPUTER-READABLE MEDIUM FOR ENLARGING OBJECTS ON DISPLAY

(71) Applicant: MORPHO, INC., Tokyo (JP)

(72) Inventors: Shun Hirai, Tokyo (JP); Jaesung Lee, Tokyo (JP); Zhengyu Chen, Tokyo (JP); Masaki Satoh, Tokyo (JP); Ryo Ono, Tokyo (JP)

(73) Assignee: MORPHO, INC., Tokyo (JP)

( * ) Notice: Subject to any disclaimer, the term of this patent is extended or adjusted under 35 U.S.C. 154(b) by 0 days.

(21) Appl. No.: 15/835,464

(22) Filed: Dec. 8, 2017

(65) Prior Publication Data

US 2018/0167558 A1    Jun. 14, 2018

(30) Foreign Application Priority Data

Dec. 8, 2016    (JP) .................................. 2016-238299

(51) Int. Cl.
*H04N 5/232*    (2006.01)
*H04N 5/235*    (2006.01)
(Continued)

(52) U.S. Cl.
CPC ......... *H04N 5/23293* (2013.01); *G03B 13/12* (2013.01); *G06F 3/0484* (2013.01);
(Continued)

(58) Field of Classification Search
CPC ........... H04N 5/23293; H04N 5/23267; H04N 5/232933; H04N 5/232945;
(Continued)

(56) References Cited

U.S. PATENT DOCUMENTS

2005/0169367 A1    8/2005    Venetianer et al.
2007/0127774 A1    6/2007    Zhang et al.
(Continued)

FOREIGN PATENT DOCUMENTS

JP    2015200700    11/2015
KR    20160134078    11/2016
(Continued)

OTHER PUBLICATIONS

Office Action of Taiwan Counterpart Application, dated Dec. 14, 2018, pp. 1-10.
(Continued)

*Primary Examiner* — Lin Ye
*Assistant Examiner* — John H Morehead, III
(74) *Attorney, Agent, or Firm* — JCIPRNET

(57) ABSTRACT

It is an object of the present disclosure to enable displaying information on unused area of an input image while displaying an enlarged image of the input image An image processing device includes a specified area setting part configured to set a specified area in an input image, an additional information setting part configured to set additional information on at least a part of non-specified area which is an area in the input image other than the specified area, and a display control part configured to display the specified area and the additional information on the display as an output image. The user can view the image of the specified area and the additional information at the same time. Therefore, the device can utilize the information of the input image more effectively.

20 Claims, 22 Drawing Sheets

(51) Int. Cl.
| | |
|---|---|
| *G03B 13/12* | (2006.01) |
| *G06F 3/0484* | (2013.01) |
| *G09G 5/10* | (2006.01) |
| *G09G 5/36* | (2006.01) |
| *G09G 5/377* | (2006.01) |
| *G09G 5/00* | (2006.01) |
| *G09G 5/02* | (2006.01) |
| *G03B 17/56* | (2006.01) |

(52) U.S. Cl.
CPC ............... *G09G 5/00* (2013.01); *G09G 5/02* (2013.01); *G09G 5/10* (2013.01); *G09G 5/36* (2013.01); *G09G 5/377* (2013.01); *H04N 5/235* (2013.01); *H04N 5/23216* (2013.01); *H04N 5/23229* (2013.01); *H04N 5/23254* (2013.01); *H04N 5/23261* (2013.01); *H04N 5/23267* (2013.01); *H04N 5/23296* (2013.01); *H04N 5/232933* (2018.08); *H04N 5/232945* (2018.08); *G03B 17/565* (2013.01); *G06F 2203/04806* (2013.01); *G09G 2320/103* (2013.01); *G09G 2340/02* (2013.01); *G09G 2340/045* (2013.01); *G09G 2340/125* (2013.01)

(58) Field of Classification Search
CPC ........... H04N 5/23261; H04N 5/23254; H04N 5/23296; H04N 5/23216; H04N 5/23229; H04N 5/235; G09G 5/02; G09G 5/00; G09G 5/10; G09G 5/377; G09G 5/36; G09G 2340/02; G09G 2340/045; G09G 2340/125; G09G 2320/103; G06F 3/0484; G06F 2203/04806; G03B 13/12; G03B 17/565

See application file for complete search history.

(56) References Cited

U.S. PATENT DOCUMENTS

| | | | |
|---|---|---|---|
| 2007/0242143 A1* | 10/2007 | Sugimoto | H04N 5/23293 348/240.2 |
| 2009/0244357 A1* | 10/2009 | Huang | H04N 5/23212 348/345 |
| 2010/0002070 A1 | 1/2010 | Ahiska | |
| 2015/0268822 A1 | 9/2015 | Waggoner et al. | |
| 2017/0339344 A1* | 11/2017 | Ishihara | G06F 3/04845 |

FOREIGN PATENT DOCUMENTS

| | | |
|---|---|---|
| TW | M361183 | 7/2009 |
| TW | 201511556 | 3/2015 |
| WO | 2012127618 | 9/2012 |
| WO | 2014069632 | 5/2014 |

OTHER PUBLICATIONS

Office Action of Taiwan Counterpart Application, dated Mar. 28, 2019, pp. 1-9.

"Office Action of Korea Counterpart Application," dated Feb. 20, 2019, p. 1-p. 6.

* cited by examiner

IMAGE MAP DATA TABLE

| IMAGE FRAME NO. | SUBJECT INFORMATION, X | | SUBJECT INFORMATION, GROUP Y | | | | | | SUBJECT INFORMATION, GROUP Z | | | | | |
|---|---|---|---|---|---|---|---|---|---|---|---|---|---|---|
| | X1 | | Y1 | | Y2 | | Yn | | Z1 | | Z2 | | Zn | |
| | x | y | x | y | x | y | x | y | x | y | x | y | x | y |
| CURRENT FRAME | 600 | 400 | 580 | 350 | 700 | 300 | ... | ... | 300 | 700 | 900 | 3 | ... | ... |
| PAST FRAME 1 | 635 | 401 | 550 | 350 | 740 | 320 | ... | ... | 330 | 650 | none | none | ... | ... |
| PAST FRAME 2 | 638 | 403 | 520 | 360 | 740 | 320 | ... | ... | 330 | 650 | 900 | 8 | ... | ... |
| PAST FRAME 3 | 639 | 405 | 580 | 370 | 740 | 320 | ... | ... | 0 | 0 | 0 | 0 | ... | ... |
| PAST FRAME ... | | | | | | | | | | | | | | |
| PAST FRAME 10 | 635 | 401 | 550 | 350 | 730 | 300 | ... | ... | 335 | 655 | 900 | 13 | ... | ... |
| PAST FRAME ... | | | | | | | | | | | | | | |
| PAST FRAME 15 | 639 | 405 | 580 | 373 | 750 | 310 | ... | ... | 331 | 649 | 900 | 8 | ... | ... |
| PAST FRAME ... | | | | | | | | | | | | | | |
| PAST FRAME 30 | 639 | 405 | 580 | 375 | 755 | 340 | ... | ... | 335 | 540 | 900 | 7 | ... | ... |
| PAST FRAME ... | | | | | | | | | | | | | | |

IMAGE PROCESSING DEVICE, ELECTRONIC EQUIPMENT, IMAGE PROCESSING METHOD AND NON-TRANSITORY COMPUTER-READABLE MEDIUM FOR ENLARGING OBJECTS ON DISPLAY

CROSS-REFERENCE TO RELATED APPLICATIONS

This application claims the priority benefit of Japan Patent application serial no. 2016-238299, filed on Dec. 8, 2016. The entirety of the above-mentioned patent application is hereby incorporated by reference herein and made a part of this specification.

TECHNICAL FIELD

The present disclosure relates to an image processing device that enlarges and displays an image, electronic equipment composed of a camera-equipped portable device and an optical device having a telephoto function attached thereto, and the like.

BACKGROUND ART

Optical attachments having a telephoto function like a binocular or a telescope for camera-equipped portable devices such as smartphones have been known in the art (e.g. Patent Document 1). Further, image processing devices that correct distortion and blur of a photographed image caused by a camera shake or the like have been known in the art (e.g. Patent Document 2).

CITATION LIST

Patent Literature

Patent Document 1: JP 2015-200700A
Patent Document 2: WO 2014/069632A
Patent Document 3: WO 2012/127618A

SUMMARY

Technical Problem

Optical zooming by means of a binocular or the like is advantageous in the high quality of the image compared to digital zooming. However, a problem with optical zooming is that a user has to manually operate it for changing the magnification or the like while viewing the image, and he/she cannot concentrate on viewing the image. In contrast, digital zooming, which enlarges an image by digital processing of the image data, is inferior to optical zooming in the image quality but can rapidly and readily change the magnification or the photographing mode according to the scene. Further, digital zooming is also advantageous in that a variety of information such as notifications that assists the user to capture an image can be displayed on a display screen.

It is possible to combine the image quality of optical zooming and the operability of digital zooming by attaching an optical device having an optical zoom telephoto function to a camera-equipped portable device having a digital zoom function such as a smartphone.

When an image optically-zoomed by an optical device is input to a portable device and the input image (optical output image) is further digitally-zoomed by the portable device, the final output image viewed by a user is a clipped partial image of the input image (optical output image) that is input to the portable device. That is, some of the image data input to the portable device as a part of the input image (optical output image) is not used for the final output image. However, conventional image processing devices do not provide any means that allows the user to understand information on the unused image data while viewing the final output image. That is, a problem with conventional image processing devices is the inability to effectively utilize the information in the input image data.

For example, when the user captures an image of a sports scene, it is expected that he/she uses the digital zoom function of the camera of a portable device to view an enlarged image around a ball. Since the user views the output image that is enlarged on the display screen of the portable device, he/she has to operate the portable device to zoom-out the image (decrease the magnification of the digital zooming or cancel the digital zooming) when he/she wants to understand the movement of the other players in the undisplayed area outside the current output image. A problem in this operation is that the image around the ball, which is of primary interest, is also zoomed out and becomes less viewable.

Solution to Problem

In order to solve the above-described problem, the following means are employed. The reference signs in brackets are those used in the description of embodiments and drawings described later. They are added for the purpose of reference, and the components of the present disclosure are not limited to those represented by the reference signs.

A first disclosure is
an image processing device, comprising:
a display (display 22, 300); an input part (input section 10, 110) to which an image is input; a specified area setting part (clipped image setting section 13, 173) configured to set a specified area (clipped data area 52) in the input image input to the input part; a display control part (display control section 20, 180) configured to display the specified area on the display; an additional information setting part (supplementary image setting section 16, 176) configured to set additional information on at least a part of a non-specified area (non-clipped data area 53) that is an area other than the specified area of the input image; and an additional information display control part (display control section 20, 180) configured to display the additional information on the display, wherein the specified area setting part (clipped image setting section 13, 173) updates the specified area corresponding to an update of the input image, and the additional information setting part (supplementary image setting section 16, 176) updates the additional information corresponding to an update of the input image.

A second disclosure is
an image processing method for performing image processing, comprising:
an input step of inputting an image; a specified area setting step (S250) of setting a specified area in the input image input in the input step; a display control step of displaying the specified area on a display; an additional information setting step (S350) of setting additional information on at least a part of a non-specified area that is an area other than the specified area of the input image; and an additional information display control step of displaying the additional information on the display, wherein the specified area setting step comprises updating the specified area corresponding to an update of the input image, and the additional information setting step comprises updating the additional information corresponding to the update of the input image.

A third disclosure is a non-transitory computer-readable medium storing a program that makes a computer perform image processing that comprises:

an input step of inputting an image; a specified area setting step (S250) of setting a specified area in the input image input in the input step; a display control step of displaying the specified area on a display (display 22, 300); an additional information setting step (S350) of setting additional information on at least a part of a non-specified area that is an area other than the specified area of the input image; and an additional information display control step of displaying the additional information on the display, wherein the specified area setting step comprises updating the specified area corresponding to an update of the input image, and the additional information setting step comprises updating the additional information corresponding to the update of the input image.

Another disclosure may be a non-transitory computer-readable medium storing any one of the above-described programs.

BRIEF DESCRIPTION OF DRAWINGS

FIG. 9 illustrates an example of image map data.

DESCRIPTION OF EMBODIMENTS

Figure 1:
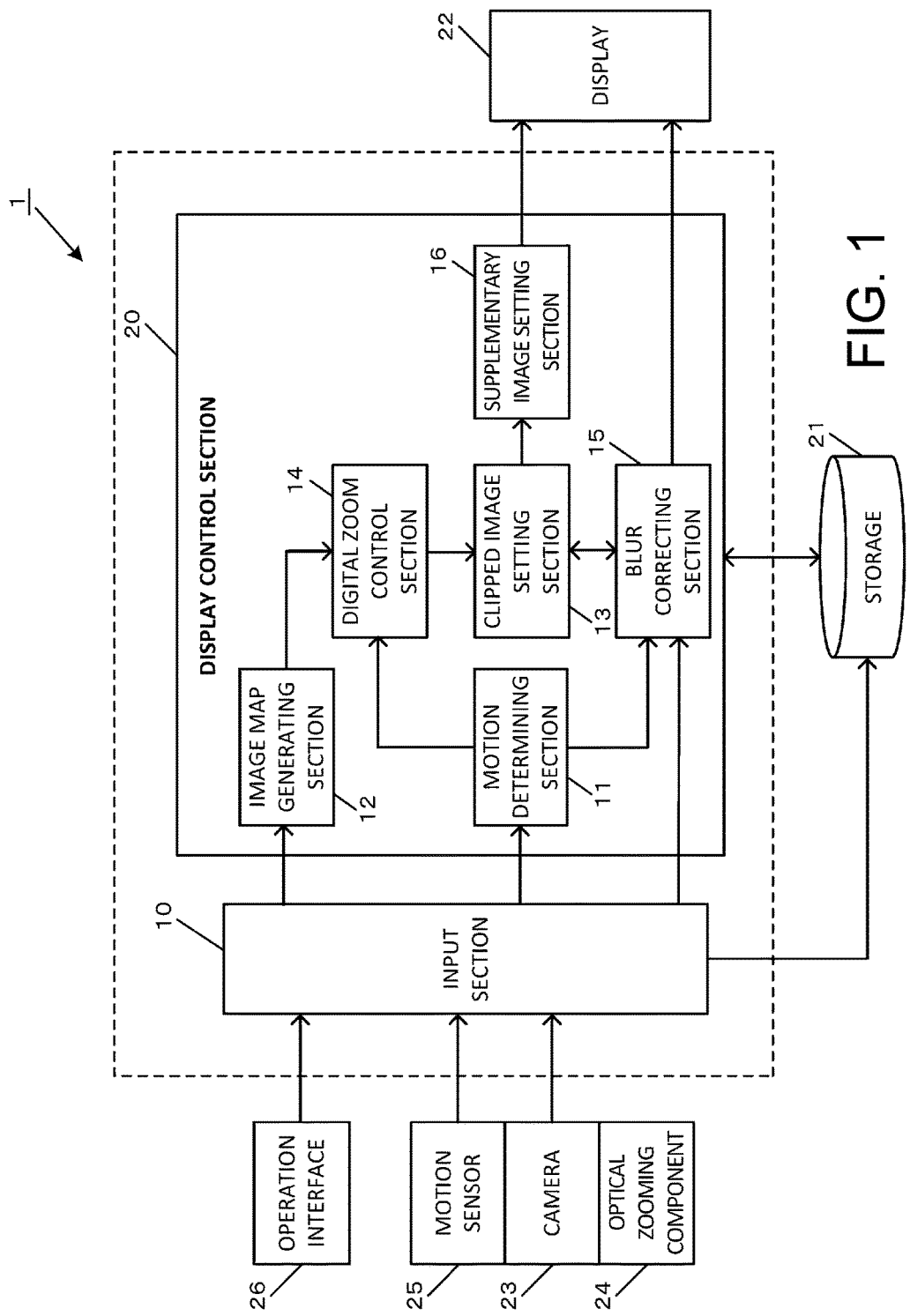
FIG. 1 is a block diagram of an example of the functional configuration of an image processing device.

The present disclosure has been made in view of the above-described problems, and an object thereof is to obtain information on the area that is not displayed in a current output image from an input image and to provide a user with the obtained information while the user is viewing the output image.

The first disclosure enables the user to check the specified area set in the input image and the additional information on at least a part of the non-specified area, which is the area other than the specified area of the input image, on the display. Further, updating the specified area according to the update of the input image and updating the supplementary information corresponding to the update of the input image allow updating the specified area and the supplementary information in synchronization with the update of the input image. For example, this enables obtaining information on the area not displayed in the current output image from the input image and providing it to the user as the supplementary information while allowing the user to continuously viewing the output image.

A fourth disclosure may be the image processing device according to the first disclosure, wherein the additional information display control part (display control section 20, 180) displays the additional information on the display in such a manner that reflects a positional relationship between the additional information and the specified area (clipped data area 52).

A fifth disclosure may be the image processing device according to the first or fourth disclosure, wherein the additional information (icon 65) comprises information on an object in the non-specified area (non-clipped data area 53).

A sixth disclosure may be the image processing device according to the fifth disclosure, wherein the additional information (icon 65) comprises information on a location of the object.

A seventh disclosure may be the image processing device according to the third or sixth disclosure, wherein the object matches a preset characteristic.

A eighth disclosure may be the image processing device according to the third or sixth disclosure, wherein the object is selected by a user or matches a characteristic set by the user.

A ninth disclosure may be the image processing device according to any one of the third to eighth disclosures, wherein the additional information display control part (display control section 20, 180) makes a determination as to whether to display the additional information (icon 65) of the object on the display (display 22, 300) based on a distance from a location of the object to the specified area (clipped data area 52).

An tenth disclosure may be
the image processing device according to any one of the first to ninth disclosures,
wherein the additional information display control part (display control section 20, 180) displays the additional information (icon 65) outside a display area of the specified area (clipped data area 52) on the display (display 22, 300).

A eleventh disclosure may be
the image processing device according to any one of the first to tenth disclosures,
wherein the additional information comprises a deformed image of the non-specified area (non-clipped data area 53).

A twelfth disclosure may be
the image processing device according to the eleventh disclosure,
wherein the additional information comprises an image of the non-specified area (non-clipped data area 53) that is deformed according to a distance to the specified area (clipped data area 52).

An thirteenth disclosure may be
the image processing device according to any one of the first to twelfth disclosures,
wherein the specified area setting part (clipped image setting section 13, 173) updates the specified area (clipped data area 52) in a shorter cycle than the additional information setting part (supplementary image setting section 16, 176) updating the additional information (icon 65).

A fourteenth disclosure may be
the image processing device according to any one of the first to thirteenth disclosures,
wherein the specified area setting part (clipped image setting section 13, 173) sets the specified area (clipped data area 52) so that a target object is included in the specified area, in which the target object is selected by a user or matches a condition set by the user.

The fifteenth disclosure may be
the image processing device according to any one of the first to thirteenth disclosures,
wherein when the additional information (icon 65) is selected according to a user input, the specified area setting part (clipped image setting section 13, 173) sets the specified area (clipped data area 52) so that a corresponding object of the additional information is included in the specified area as a target object.

A sixteenth disclosure may be
the image processing device according to the twelfth or fifteenth disclosure,
wherein the specified area setting part (clipped image setting section 13, 173) updates the specified area (clipped data area 52) corresponding to an update of the input image so that the target object is included in the specified area.

A seventeenth disclosure may be
the image processing device according to the sixteenth disclosure,
wherein the specified area setting part (clipped image setting section 13, 173) changes a magnification of the specified area (clipped data area 52) corresponding to the update of the input image so that the target object is included in the specified area.

A eighteenth disclosure may be
the image processing device according to any one of the twelfth to sixteenth disclosures, further comprising:
an imaging part (camera 23, imaging section 500); and
a notification part configured to prompt the user to change a photographing direction of the imaging part such that the specified area (clipped data area 52) including the target object gets close to the center of the input image.

A nineteenth disclosure may be
the image processing device according to the twelfth to seventeenth disclosures, further comprising:
an information display control part (display control section 20, 180) configured to display a notification of the target object being not included in the input image on the display (display 22, 300) when the target object gets out of the input image.

An twentieth disclosure is
an image processing device comprising: a display (display 22, 300) capable of displaying an input image; and
a brightness adjusting part (processing section 100, display control section 20, 180) configured to adjust a brightness of the input image when the input image includes an object that meets a predetermined brightness condition.

The brightness adjusting section may reduce the brightness of an image area corresponding to the object.

A twenty first disclosure is
an image processing device, comprising: an imaging part (camera 23, imaging section 500); a display (display 22, 300); a calculating part (processing section 100 configured to calculate a sun direction from a location information of the imaging part; and a display control part (display control section 20, 180) configured to display on the display an alert that warns a user not to point the imaging part in the sun direction.

Another disclosure may be
the image processing device according to the twenty first disclosure, further comprising:
a location calculating part (processing section 100) configured to calculate a location of the imaging part from at least one of a satellite positioning system (GPS, etc.) and an inertial navigation system (INS, etc.),
wherein the calculating part calculate the sun direction based on the location information on the location calculated by the location calculating part.

A twenty second disclosure may be
an image processing device, comprising:
a display (display 22, 300); an imaging part (camera 23, imaging section 500) configured to photograph an image; an input part (input section 10, 110) to which the image photographed by the imaging part is input; a display control part (display control section 20, 180) configured to enlarge the input image input to the input part to display the enlarged image on the display; and a correction indication value setting part (motion determining section 11, 171, blur correcting section 15, 175) configured to detect a movement of the imaging part and to set a correction indication value according to the detected movement,
wherein the display control part (display control section 20, 180) updates the displayed image based on the correction indication value corresponding to an update of the input image.

A twenty third disclosure may be
the image processing device according to the twenty second disclosure,
wherein when the correction indication value is greater than a first threshold, the display control part (display control section 20, 180) reduces a magnification of the displayed image in updating the displayed image.

A twenty fourth disclosure may be the image processing device according to the twentieth or twenty third disclosure, wherein when the correction indication value is less than the second threshold, the display control part (display control section 20, 180) performs reduction of blur at a higher strength than in a case in which the correction indication value is greater than the second threshold in updating the displayed image.

A twenty fifth disclosure may be the image processing device according to the twenty second disclosure, wherein the correction indication value setting part (motion determining section 11, 171, blur correcting section 15, 175) changes the correction indication value based on a location of an enlarged and displayed area of the input image.

A twenty sixth disclosure may be the image processing device according to the twenty second disclosure, wherein the correction indication value setting section (motion determining section 11, 171, blur correcting section 15, 175) changes the correction indication value based on a location of an object in the input image.

A twenty seventh disclosure may be the image processing device according to the twenty second disclosure, wherein when a predetermined object having characteristics that meet a predetermined condition is included in only one or some of respective specific areas (clipped data area 52) of input images that are serially photographed by the imaging part, a specific area that includes the predetermined object are replaced with another specific area that does not include the predetermined object.

A twenty eighth disclosure may be the image processing device according to the twenty second disclosure, wherein when a predetermined object having characteristics that meet a predetermined condition is included in only one or some of respective specific areas (clipped data area 52) of input images that are serially photographed by the imaging part, a predetermined object area in a specific area that includes the predetermined object is replaced with a corresponding area in another specific area that does not include the predetermined object.

A twenty ninth disclosure may be the image processing device according to the twenty second disclosure, wherein the image processing device is configured such that an external lens (optical zooming component 24, 550) that is different from a lens of the imaging part (camera 23, imaging section 500) is attachable, and the image processing device further comprises: an attachment information detecting part (processing section 100) configured to detect information for specifying an attaching position or an attaching angle of the external lens (optical zooming component 24, 550) by using an input image that is photographed with the attached external lens.

A thirtieth disclosure may be the image processing device according to the twenty ninth disclosure, further comprising:

a determining part (processing section 100) configured to make a determination as to whether the external lens (optical zooming component 24, 550) is correctly attached based on the information detected by the attachment information detecting part (processing section 100), wherein information on a determination result of the determining part is displayed on the display (display 22, 300).

A thirty first disclosure may be the image processing device according to the twenty ninth disclosure, further comprising:

an input image correcting part (processing section 100) configured to correct the input image based on the information detected by the attachment information detecting part (processing section 100).

A thirty second disclosure is an image processing method for performing image processing, comprising:

an imaging step of photographing an image by means of an imaging part; an input step of inputting the photographed image; a display control step of enlarging the input image input in the input step to display the enlarged image on the display (display 22, 300); and a correction indication value setting step (S150, S300) of detecting a movement of the imaging part and setting a correction indication value according to the detected movement, wherein the display control step comprises updating the displayed image based on the correction indication value corresponding to an update of the input image.

A thirty third disclosure is a non-transitory computer-readable medium storing a program that makes a computer perform image processing that comprises:

an imaging step of photographing an image by means of an imaging part; an input step of inputting the photographed image; a display control step of enlarging the input image input in the input step to display the enlarged image on the display (display 22, 300); and a correction indication value setting step (S150, S300) of detecting a movement of the imaging part and setting a correction indication value according to the detected movement, wherein the display control step comprises updating the displayed image based on the correction indication value corresponding to an update of the input image.

Hereinafter, an example of a suitable embodiment of the present disclosure will be described. In the drawings, the same reference signs are denoted to the same components, and the repetitive description thereof is omitted. The dimension of the components in the drawings is not always identical to the actual dimension. It should be understood well that the embodiments of the present disclosure are not limited to the following embodiment.

1. Image Processing Device

An image processing device according to the embodiment outputs information on the area that is not displayed in an output image but is present in an input image while displaying the enlarged output image. For example, the image processing device according to the embodiment is used for capturing a sequence of photographs or creating a video.

For example, the image processing device according to the embodiment is preferably installed in mobile terminals having a limited resource such as mobile phones, digital cameras and PDAs (personal digital assistants). However, the application is not limited thereto, and it may also be installed in, for example, normal computer systems.

1-1. Configuration and Principle

Names of Images

As used herein, an input image 50 refers to an image that is input to an input section of the image processing device. When an optical zooming component is connected to a camera of the image processing device and the optical zooming is used, an optically enlarged image is input to the image processing device through the camera.

The illustration of the input image 50 in the following description and the drawings is a conceptual image of input image data, an input frame or an optical output image. An output image 60 refers to an image that is displayed on a display of the image processing device to be viewed by a user. When digital zooming is not used, the input image 50 (optical output image) is displayed on the display as the output image 60. When digital zooming is used, the output image 60 is an enlarged image of the input image 50 (optical output image), which is created by means of the digital zoom function. In the embodiment, optical zooming is not used unless otherwise noted. However, it should be understood well that the same advantageous effects are obtained even when optical zooming is used.

The output image 60 of the embodiment is composed of a main image and a sub image. When the output image 60 is an enlarged image, the main image is an image of a clipped partial area of the data of the input image 50 (hereinafter referred to as a clipped data area 52). Accordingly, the main image is also referred to as a clipped image 62 in the following description. The sub image refers to an image of information on the remaining area of the data of the input image 50 after clipping the clipped data area 52 (hereinafter referred to as a non-clipped data area 53), which is also referred to as a supplementary image 63 in the following description. In the light of the function, the supplementary image 63 may also be referred to as an additional information image, a supplementary information image or the like.

FIG. 1 is a block diagram illustrating an example of the functional configuration of the image processing device 1 according to the embodiment. The image processing device 1 includes an input section 10 and a display control section 20. The display control section 20 includes a motion determining section 11, an image map generating section 12, a clipped image (main image) setting section 13, a digital zoom control section 14, a blur correcting section 15 and a supplementary image (sub image) setting section 16. They are functional sections (functional blocks) of the processing component (processing device, not shown) of the image processing device 1, which are constituted by processors such as a CPU and a DSP and integrated circuits such as an ASIC.

The input section 10 has a function of inputting an image photographed by a camera 23 (hereinafter referred to as a "photographed image"), information output from a motion sensor 25 and information output from an operation interface 26. The photographed image is output from the input section 10 to a storage 21 and stored therein. The input section 10 has a function of outputting image data of an input image (hereinafter also referred to an input frame image) to the motion determining section 11 and the image map generating section 12.

The motion sensor 25, which is embedded with or attached to the camera 23, acquires motion information of the camera 23 when a user moves the camera 23. The motion sensor 25 is constituted by an acceleration sensor for detecting the triaxial acceleration and an angular velocity sensor (gyroscope sensor) for detecting the triaxial angular velocity, or by a sensor part such as an inertial measurement unit (IMU) which is a package of these sensors. The motion sensor 25 detects the acceleration and the angular velocity as the motion information and outputs the detected motion information to the motion determining section 11. By using the angular velocity and acceleration detected by the motion sensor 25, it is possible to detect the direction and the displacement of the camera 23. The output values of the motion sensor 25 are output to the motion determining section 11 and the blur correcting section 15 through the input section 10.

The optical zooming component 24 is an optical telephoto device having a telephoto function, which is detachably connected to the camera 23 with a jig or the like.

The display control section 20 has a function of controlling the motion determining section 11, the image map generating section 12, a digital zoom control section 14, a blur control section 15, a clipped image setting section 13 and a supplementary image setting section 16, which are internal sections of the display control section 20, by using information on the input frame image stored in the storage 21, the motion information of the camera 23 detected by the motion sensor 25 and user operation information input from the operation interface 26. The display control section also has a function of controlling the display 22.

The motion determining section 11 determines the degree of motion of the camera 23 by using the output information from the motion sensor 25 or the image data of input frames. Alternatively, the motion determining section 11 may use the image data of the current input frame and the image data of the past input frame which is the latest or older frame photographed before the current input frame to make the determination. It is possible to use both the output information from the motion sensor 25 and the image data of input frames.

User actions that move the camera 23 are classified into user unintentional actions such as tremor in the hand holding the camera and camera shakes, and user intentional actions. It is assumed that the user intentional actions are further classified into two types, which are panning/tilting actions that move the camera 23 for tracking the movement of a subject of interest and actions that move the camera 23 to a comparatively large extent for changing the subject of interest or the scene. Upon these characteristics, it is possible to determine as to whether a user action is a panning/tilting action or a subject changing action or the like based on the degree of motion of the camera 23.

Specifically, for example, three thresholds of first to third thresholds are set for the output value from the motion sensor 25 as third threshold>second threshold>first threshold, which serve as indicators of the degree of motion of the camera as described later. The determination may be made such that when the output value from the motion sensor 25 is equal to or greater than the third threshold, the user action is determined as a subject changing action. When the output value is equal to or greater than the second threshold but less than the third threshold, a user action is determined as a panning/tilting action. When the output value is less than the first threshold, it is determined that the camera is not in motion (fixed). When the output value is equal to or greater than the first threshold but less than the second threshold, it is determined that the camera is slightly in motion (slight motion).

The image map generating section 12 detects an object in the input image 50 by using the image data of the input image 50 according to a method known in the art such as object recognition, human recognition and face recognition. Further, the image map generating section 12 has a function of detecting an object by using the color information of the object. The location information of the detected object is output to the storage 21 and saved as image map data with respect to each input frame along with the frame number of the frame from which the object is detected. It is preferred to perform the detection on all input frames. However, in order to avoid an increase of the data processing load, the detection may be performed at every predetermined number of frames, e.g. every 10 frames.

The detection using the color information of an object is made based on color information preset by the user. The detection using the color information can be made by evaluation of the degree of motion of a color, for example, as described in Patent Document 3 (WO 2012/127618). Specifically, first, the degree of motion of the pixels between image frames and the color of the pixels in the image frames are determined. Subsequently, an evaluation score indicating the degree of motion of a color is calculated from the degree of motion with respect to each color, and a moving object is detected based on the calculated evaluation score. The evaluation score is calculated with respect to each color preferably by accumulating the number of pixels with a certain color in the image frames and the degree of motion of the pixels with the color and calculating the evaluation score of the color from the accumulated number of pixels in the image frames and the accumulated degree of motion. Further, by accumulating the location information of pixels with respect to each color, it is possible to specify the location of a moving object based on the accumulated number of pixels and the accumulated location information of the respective colors. While the technique disclosed in Patent Document 3 is described, the detection techniques applicable to the embodiment are not limited thereto, and a technique different from Patent Document 3 may also be used. For example, the detection may be also made based on a SVM (support vector machine) or DL (deep learning) with preset color information. Further, the image map generating section 12 may be configured to detect only an object having color information that matches information distributed or sold by a broadcasting station of sport programs or the like.

The clipped image setting section 13 sets information on the clipped image for displaying the enlarged image in the output image. As described above, the output image is composed of the clipped image (main image) and the supplementary image (sub image). The setting information on the clipped image is output to the display 22.

The digital zoom control section 14 has a function of controlling the digital zoom magnification of the image that is input from the camera 23 to the input section 10. For example, the digital zoom magnification is set to 2× by the user through the operation interface 26. The digital zoom magnification is output from the digital zoom control section 14 to the clipped image setting section 13 as digital zoom magnification information and used for setting the clipped image.

The blur correcting section 15 has a function of removing defects such as camera shakes and rolling shutter effects (skew) of frame images and outputs corrected frame images. The blur correction processing may be made according to a correction technique known in the art. For example, the technique disclosed in Patent Document 2 (WO 2014/069632A) can be used. The image processing device in Patent Document 2 separates a deforming change of an image into three components of a rolling shutter effect component, at least one of a parallel shift component and a rotation component, and the other components and calculates the individual components individually. For example, this enables excluding the rolling shutter component from a correction for removing camera shakes and the like. That is, it is possible to reduce the calculation cost of the correction and to facilitate designing a correction filter. Further, since the parallel shift component or the rotation component and the component included in a supplementary matrix are respectively calculated using different expressions, it is possible to correct the parallel shift component or the rotation component, which strongly reflects user intention, irrelevantly and independently from the other components. That is, it is possible to use different filters to correct a motion component that strongly reflects user intention and the other motion components. This enables removing defects caused by an unintentional user movement while properly following the movement of the camera.

In the following, the image processing device and the image processing method disclosed in Patent Document 2 will be described.

Let P be the motion data (motion vector) between a reference frame image "frame$^{i-1}$" and a target frame image "frame$^{i}$". Further, let $P_{dst}^{i-1}$ be the conversion formula (first projection matrix) that relates a clipped area $K^{i-1}$ of the reference frame image "frame$^{i-1}$" to an output frame image "out-frame$^{i-1}$". Then, the conversion formula (second projection matrix) $P_{dst}^{i}$ that relates a clipped area $K^i$ of the frame image "frame$^{i}$" to the output frame image "out-frame$^{i}$" can be calculated from the motion data P and the first projection matrix $P_{dst}^{i-1}$ as $P_{dst}^{i}=P \cdot P_{dst}^{i-1}$ (Expression 1). The condition of Expression 1 corresponds to a mode in which the clipping area is completely fixed. However, it is necessary to reflect user intentional actions (e.g. parallel shifts and panning/tilting of the camera) while removing defects such as a camera shake. For example, a high-pass filter is used to filter user-intentional actions and defect movements. In this case, the second projection matrix is expressed by $P_{dst}^{i}$ is $P_{dst}^{i}=\text{HPF}(P \cdot P_{dst}^{i-1})$ (Expression 2), where HPF is a high-pass filter. That is, high-frequency components such as camera shakes are passed so that the screen is fixed, while low-frequency components including user intentional movements are cut so that the screen follows the user movements.

However, the motion data P also includes a rolling shutter effect component. A rolling shutter effect (skew) refers to distortion that deforms a subject into a parallelogram in the horizontal direction when the camera is moved in the horizontal direction relative to the subject and that expands or reduces a subject in the vertical direction when the camera is moved in the vertical direction. Since the rolling shutter effect component has to be always corrected, it is preferred that the high-pass filter always passes it. That is, it is not necessary to apply the high-pass filter to the rolling shutter effect component. It is therefore necessary to build a process that excludes the rolling shutter effect component and then performs the processing that reflects user-intentional movements while removing defects such as camera shakes. Although details should be found in Patent Document 2, the second projection matrix $S_i$ in the system including no rolling shutter effects is expressed by $S_i=\text{HPF}(H \cdot S_{i-1})$ (Expression 3). Further, the second projection matrix $P_{dst}^{i}$ is expressed by $P_{dst}^{i}=D_i \cdot S_i=D_i \cdot \text{HPF}(N \cdot S_{i-1})$ (Expression 4), where N is the motion data in the system including no rolling shutter effects, $S_{i-1}$ is the vector (projection matrix) that relates a clipped area of an image "RS_frame$^{i-1}$", which is the reference frame image "frame$^{i-1}$" with no rolling shutter effect component, to the output frame image "out-frame$^{i}$".

A first calculator calculates the first matrix $D_i$ including the rolling shutter effect component. Since the degree of distortion increases with an increase of the moving speed of the camera, it is possible to estimate the rolling shutter effects from the moving speed of the camera. The moving speed of the camera can be estimated from the distance of parallel shift between frames. Based on this, the first calculator calculates the first matrix $D_i$ including the rolling shutter effect component, for example, from the distance of parallel shift included in the motion data P. With the first matrix $D_i$, it is possible to convert the target frame image "frame$^i$" to the frame "RS_frame$^i$" in the system with no rolling shutter effects. As a result, it is also possible to determine the motion data N in the system with no rolling shutter effects from the motion data P and the first matrix $D_i$. With the motion data N, it is possible to exclusively apply a high-pass filter only to $N \cdot S_{i-1}$ in which no rolling shutter effect is considered.

However, since $N \cdot S_{i-1}$ is a matrix, directly applying a high-pass filter to $N \cdot S_{i-1}$ may complicate the processing. To avoid this, the motion components of $N \cdot S_{i-1}$ are separated into a user-intention-reflected camera motion component and the other motion components. The second calculator calculates a second matrix that includes the user-intention-reflected camera movement. A supplementary matrix calculator calculates a supplementary matrix that includes the other movements.

To determine the second matrix including the user-intention-reflected camera movement, the second calculator calculates a user motion matrix Ac. The user motion matrix Ac includes at least one of a parallel shift component in a direction perpendicular to the imaging direction and a rotation component about the axis in the imaging direction. The second calculator corrects the user motion matrix Ac to calculate the second matrix. The second calculator has a function of removing the high-frequency component caused by a camera shake and the like with regard to the user-intention-reflected camera movement. The second calculator removes the frequency component caused by a camera work by means of a high-pass filter.

The second calculator calculates the user motion matrix Ac and corrects the user motion matrix Ac to calculate the second matrix. For example, a high-pass filter is used for the correction to obtain the second matrix. The motion matrix Ac includes at least one of a parallel shift component in a direction perpendicular to the imaging direction and a rotation component about the axis in the imaging direction. The second calculator can calculate the user motion matrix Ac from the motion data P. Specifically, the second calculator specifies the center coordinate of the frame image "frame", for example, from a known first projection matrix $P_{dst}^{i-1}$ that projects the output frame image "out-frame" to the first frame image, and the motion data P. Then, the second calculator calculates the user motion matrix Ac that projects the coordinate (x, y) of the output frame image "out-frame" to the center (X, Y) of the frame image "frame" through parallel shift and rotation. The yaw, roll and pitch components can be estimated, for example from the moving distance of the center area and the focal distance with a certain precision. Further, the supplementary matrix calculator calculates a supplementary matrix from the motion information N, the first matrix $D_i$ and the past supplementary matrix. The complementary matrix includes motion components that are included in neither the first matrix $D_i$ nor the second matrix.

When the user motion matrix Ac mainly includes a rotation component, the second matrix may be obtained by applying the high-pass filter to the user motion matrix Ac that includes the yaw component yi, pitch component pi and the roll component ri. The supplementary matrix may be obtained by applying the high-pass filter to a motion matrix Bc that includes the components included in neither the first matrix nor the second matrix. The second projection matrix $P_{dst}^i$ that corresponds the output frame image "out-frame$^i$" to the input frame image "frame$^i$" is expressed by using the first matrix $D_i$, the second matrix and the supplementary matrix as $P_{dst}^i = D_i \cdot HPF(yi) \cdot HPF(pi) \cdot HPF(ri) \cdot HPF(li)$ (Expression 5).

While the technique disclosed in Patent Document 2 is described, the techniques for correcting distortion and camera shake applicable to the embodiment are not limited thereto, and techniques and calculation formulae different from those in Patent Document 2 may also be used. That is, any technique can be used that corrects distortion and blur by estimating the parallel shift/rotation component and the like as a factor of the blur and changing the coefficient of a filter for the correction according to the situation.

The supplementary image setting section 16 has a function of setting information for displaying the supplementary image. For example, the information is displayed in the supplementary image as an icon resembling the detected object or the like. When object recognition is performed based on the color information, it is preferred to render an icon or the like in the color of the detected object at the location corresponding to the detected location. The setting information for displaying the supplementary image is output to the display 22.

The display 22 displays the output image composed of the clipped image and the supplementary image by using the setting information output from the clipped image setting section 13 and the supplementary image setting section 16.

The optical zooming component 24 is an optical device with a telephoto lens, which is connected to the camera 23 with a jig or the like.

In the following description, the optical zoom function of the optical zooming component 24 is not used unless otherwise noted. However, it should be understood well that the same advantageous effects are obtained even when the optical zoom function is used.

Example of Displaying Supplementary Image

Figure 2:
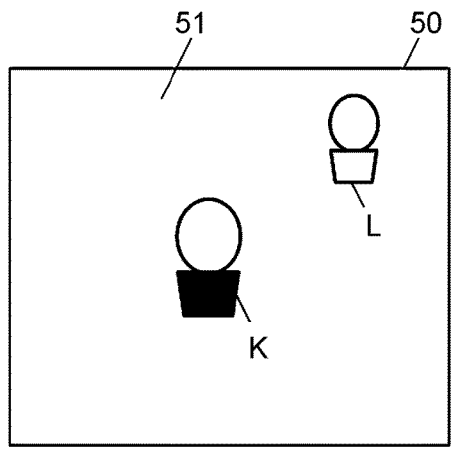
FIG. 2 (1A) to FIG. 2 (3B) illustrate an example of an input image and an output image.
Figure 2:
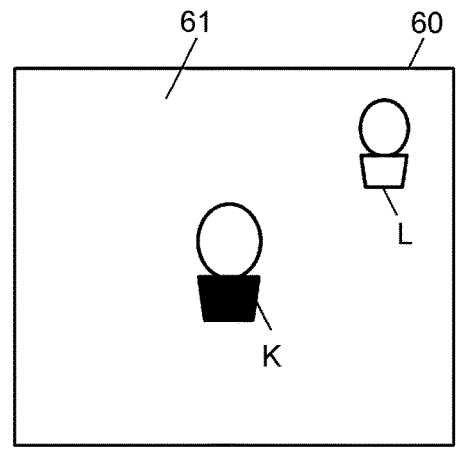
Figure 2:
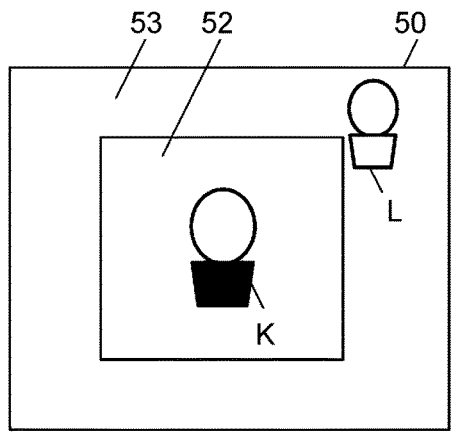
Figure 2:
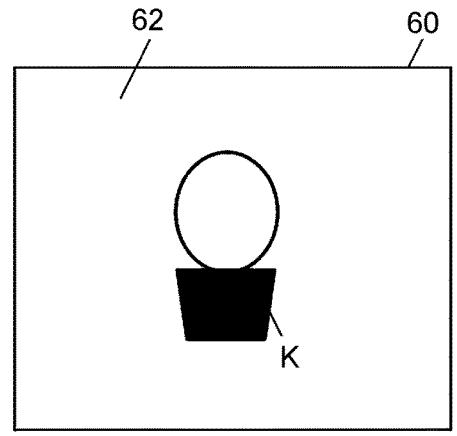
Figure 2:
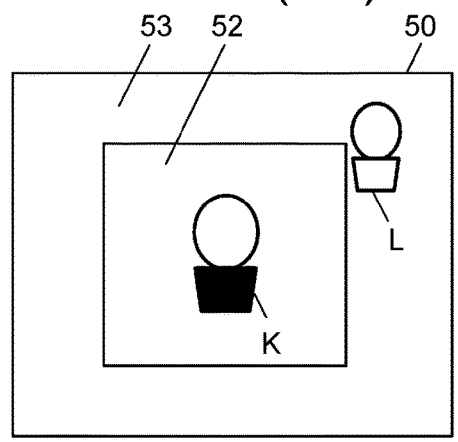
Figure 2:
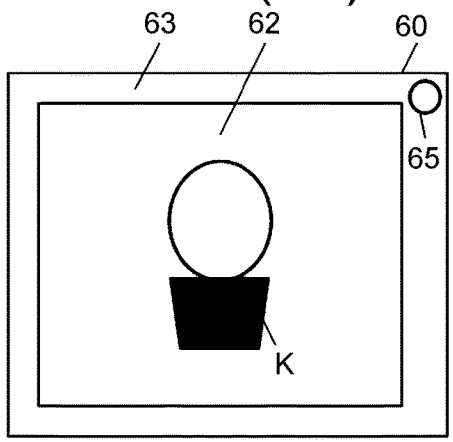

FIG. 2 (1A) and FIG. 2 (1B), and FIG. 2 (2A) and FIG. 2 (2B) illustrate a problem with the prior art in which no supplementary image is displayed. In contrast, FIG. 2 (3A) and FIG. 2 (3B) illustrate an example of displaying the supplementary image of the embodiment and the advantageous effects thereof. In the description with FIG. 2 (1A) to FIG. 2 (3B), the camera 23 is not moved, and the correction of distortion (correction of camera shake, correction of rolling shutter effects) is not considered.

First, the relationship between the image data of the input image 50 and the output image 60 in the prior art in which no supplementary image is displayed will be described with FIG. 2 (1A) and FIG. 2 (1B) and FIG. 2 (2A) and FIG. 2 (2B).

FIG. 2 (1A) and FIG. 2 (1B) illustrate an example of the relationship between the image data of the input image and the output image when the digital zoom function is not used (digital zoom magnification is 1×). When the digital zoom function is not used, the entire image data area 51 of the input image 50 in FIG. 2 (1A) is displayed in the display area 61 of the output image 60 in FIG. 2 (1B). That is, as illustrated in FIG. 2 (1A) and FIG. 2 (1B), the subjects K and L included in the image data area 51 of the input image 50 are displayed in the display area 61 of the output image 60.

Next, FIG. 2 (2A) and FIG. 2 (2B) illustrate the relationship between the image data of the input image and the output image 60 when the digital zoom magnification of the output image 60 has been changed from 1× as illustrated in FIG. 2 (1A) and FIG. 2 (1B) to 2×.

The subject K, which was located in the center of the display area 61 of the output image 60 in FIG. 2 (1B), is enlarged twice in FIG. 2 (2B). In contrast, the subject L, which was displayed near the edge of the display area 61, is not displayed in the output image 60 in FIG. 2 (2B).

Since the digital zoom magnification is 2×, the output image 60 in FIG. 2 (2B) is a twice-enlarged image of a clipped part of the image data of the input image 50 in FIG. 2 (2A). That is, a clipped data area 52 of the input image 50 in FIG. 2 (2A) is enlarged twice by digital processing, and this clipped image 62 is displayed as the output image 60 in FIG. 2 (2B).

A non-clipped data area 53, which is the remaining area of the image data area 51 of the input image 50 in FIG. 2 (2A) after clipping the clipped data area 52, is still present as image data of the input image 50 but is not displayed in the output image 60 in FIG. 2 (2B). When the output image 60 is enlarged, the user cannot view the information in the non-clipped data area 53. That is, the subject L is displayed in the output image 60 in FIG. 2 (1B) but is not displayed in the output image 60 in FIG. 2 (2B) because the subject L is located in the non-clipped data area 53. To view the information in the non-clipped data area 53 again, it is necessary to cancel the digital zooming to terminate the enlargement. This is the relationship between the image data of the input image 50 and the display area of the output image 60 in the prior art in which no supplementary image is displayed.

Next, the relationship between the image data of the input image 50 and the output image 60 in the embodiment in which the supplementary image is displayed will be described with FIG. 2 (3A) and FIG. 2 (3B). The subjects and the digital zoom magnification are the same as those in FIG. 2 (2B).

In the same manner as in FIG. 2 (1B), the subject K, which is located in the center of the display area 61 of the output image 60 in FIG. 2 (1B), is enlarged twice in FIG. 2 (3B). In contrast, the subject L, which is located near the edge of the display area 61 of the output image 60 in FIG. 2 (1B), is schematically displayed as a circle icon 65 resembling the subject L in the supplementary image 63 in FIG. 2 (3B). The clipped image 62 of the output image 60 in FIG. 2 (3B) is a twice-enlarged image of the clipped data area 52 of the input image 50 in FIG. 2 (3A). The supplementary image 63 is more effective, for example, when the subject L is detected by object recognition based on the color information, and the round icon 65 is rendered in the color of the detected subject L.

The supplementary image 63 in FIG. 2 (3B) is formed in the area other than the clipped image 62 of the output image 60. The supplementary image 63 serves as an area for displaying the information on the non-clipped data area 53 of the input image 50 in FIG. 2 (3A).

As described above, with the image processing device 1 of the embodiment, the user who views the output image 60 in FIG. 2 (3B) can obtaining the location information, the color information and the like of the subject L from the supplementary image 63 while viewing the subject K enlarged in the clipped image 62 as the main image, although the subject L has been disappeared by the enlargement. That is, since the output image 60 includes the clipped image 62 and the supplementary image 63, the user can obtain more of the information originally included in the input image data than in the prior art.

1-2. Processing

Figure 3:
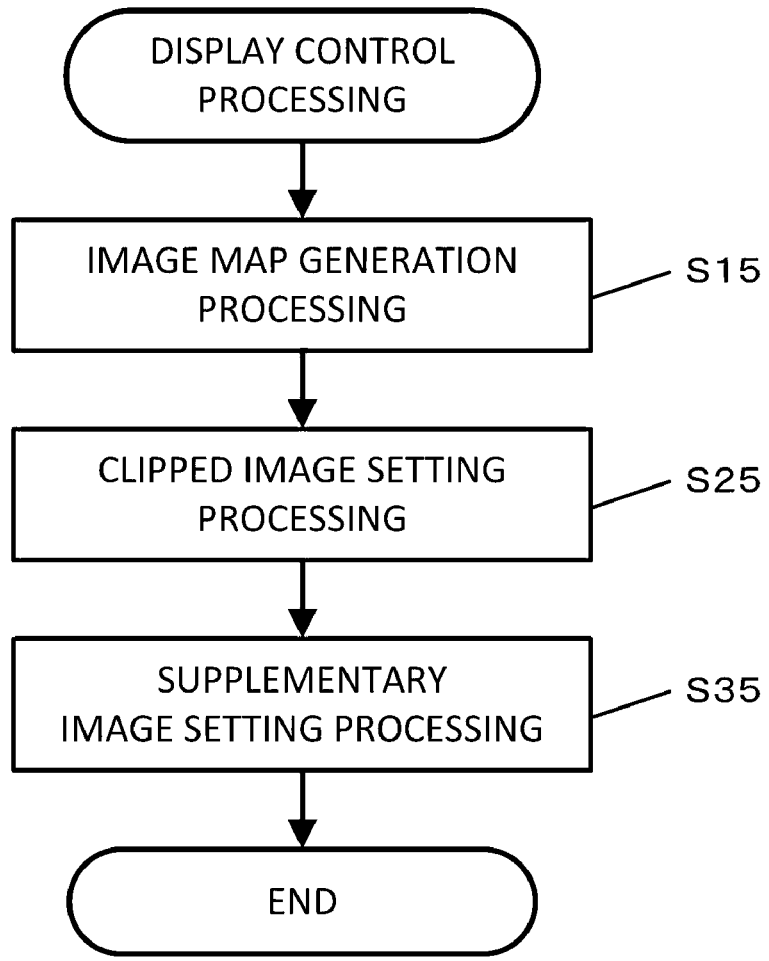
FIG. 3 is a flowchart illustrating an example of the processing flow in the image processing device.
Figure 4:
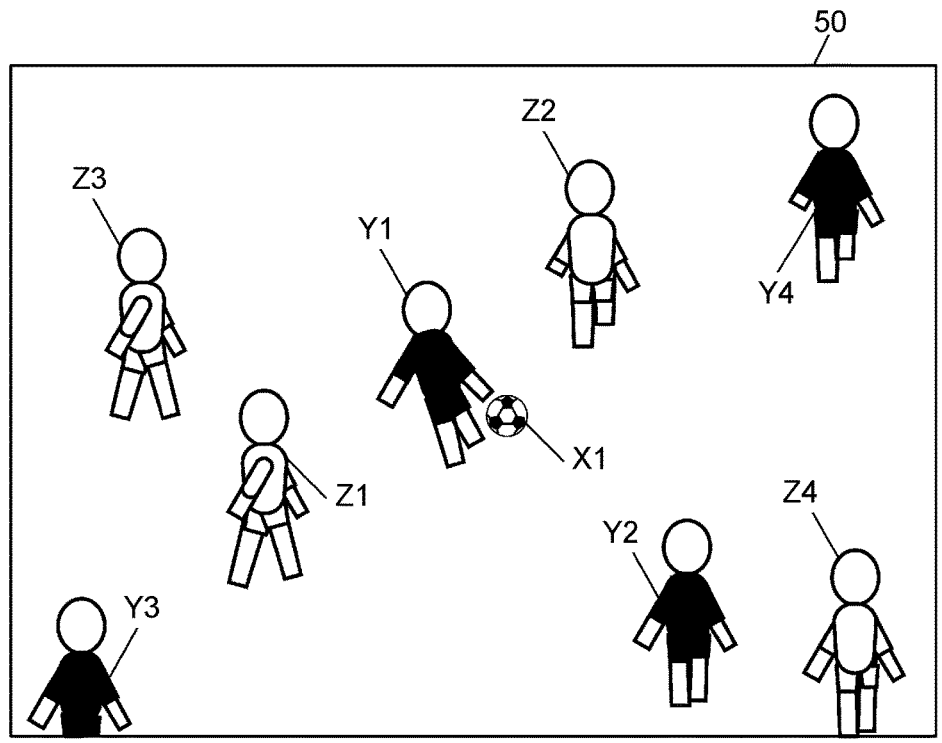
FIG. 4 (1) and FIG. 4 (2) illustrate an example of the input image and the output image.
Figure 4:
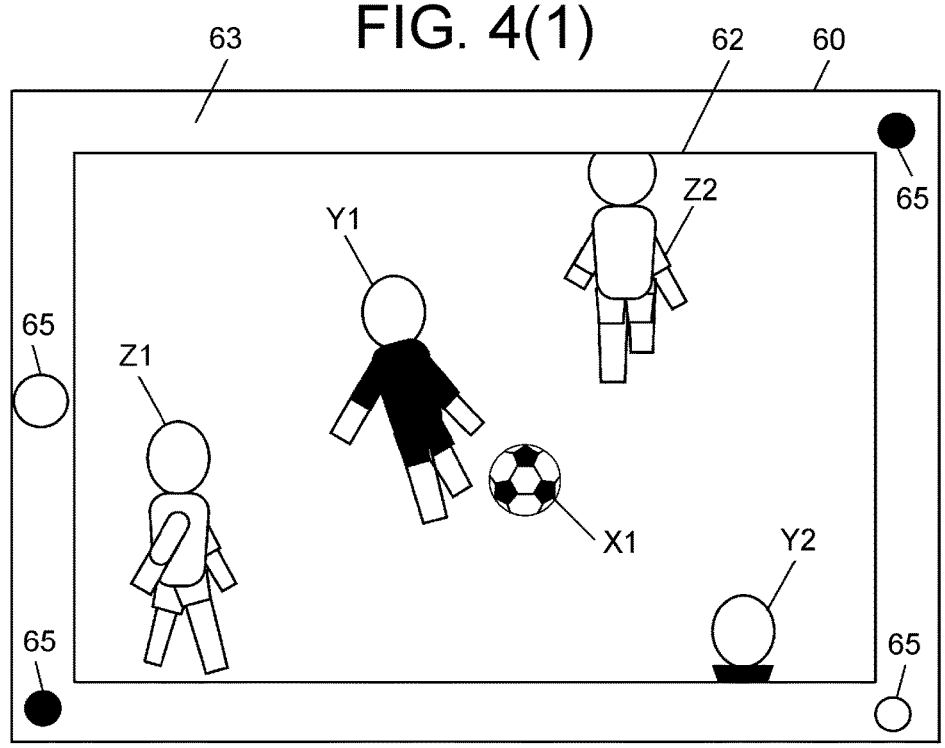

Processing to display the output image composed of the clipped image (main image) and the supplementary image (sub image) will be described with FIG. 3, FIG. 4 (1) and FIG. 4 (2). FIG. 3 is a flowchart illustrating an example of the flow of the display control processing. FIG. 4 (1) and FIG. 4 (2) are photographed images of a scene of a football game, where FIG. 4 (1) is the input image data, and FIG. 4 (2) is an example of the output image composed of the clipped image (main image) and the supplementary image (sub image) in which the digital zooming is 2× as in FIG. 2 (3B).

To simplify the description, the example of FIG. 4 (1) and FIG. 4 (2) assumes the condition in which the location of the camera 23 is fixed, and the subjects of a football X1, players in black uniform Y1 to Y4, players in white uniform Z1 to Z4 (hereinafter referred to as the ball X, the blacks Y1 to Y4 and the whites Z1 to Z4) do not move, i.e. the condition of a still image captured from a fixed position.

The display control processing is performed by the display control section 20 of the image processing device 1 according to a display control program stored in the storage 21. The display control processing is performed when the user activates the application of the image processing device 1.

Once the display control program is activated, the image map generating section 12 performs image map generation processing so as to perform object detection to generate image map data from input image data (S15). The object detection is performed based on user-preset color information with respect to each input frame. In the image map data, the location information (coordinate information in the input image data) of each detected object is recorded with respect to each input frame. In the example in FIG. 4 (1) and FIG. 4 (2), the color information preset by the user is the color of the ball or the uniform, and the location information of the ball X1, the blacks Y1 to Y4 and the whites Z1 to Z4 is recorded in the image map data with respect to each input frame. It is preferred that the digital zoom magnification is also recorded along with the input frames.

The object detection and the record of the location information may be made every predetermined number of input frames. Further, the location (coordinate) of each object recorded in the image map data may indicate the center point of a rectangle that encloses the object. When the object detection includes contour extraction, the extracted contour may be used instead as a figure that encloses the object.

Subsequently, the motion determining section 11 determines the degree of motion of the camera 23 based on the output value from the motion sensor 25 and the preset thresholds and outputs the determination result to the digital zoom control section 14 and the blur correcting section 15. In the example in FIG. 4 (1) and FIG. 4 (2), it is determined that the camera 23 is not in motion since the camera 23 is fixed, and the process continues with the next step.

The digital zoom control section 14 outputs a setting value of the digital zoom magnification, which is input though the operation interface 26, to the clipped image setting section 13. Further, the digital zoom control section 14 has a function of adjusting the digital zooming according to the determined motion level when the motion determining section 11 determines that the camera 23 is in motion.

The blur correcting section 15 corrects movements such as camera shake, for example, according to the above-described technique disclosed in Patent Document 2. Further, the blur correcting section 15 has a function of changing the correction level or cancelling the correction according to the determined motion level when the motion determining section 11 determines that the camera 23 is in motion.

Then, the clipped image setting section 13 performs clipped image setting processing to set the clipped image 62 (S25). The motion information of the camera 23 and the digital zoom magnification information are output respectively from the motion determining section 11 and the digital zoom control section 14 to the clipped image setting section 13. In the example in FIG. 4 (2), the clipped image 62 is set such that the center point thereof is coincide with the center point of the output image 60. The display size of the clipped image 62 is calculated from the size of the display 22, the digital zoom magnification set by the user (2× in FIG. 4 (2)) and the size ratio of the output image 60 and the clipped image 62. The setting value of the clipped image 62 is output to the display 22. The clipped image 62 is updated in real time corresponding to each input frame.

Alternatively, the clipped image setting processing may be such that the supplementary image setting section 16 sets the size of the supplementary image 63 and outputs the setting value of the supplementary image 63 to the clipped image setting section 13, and the clipped image setting section 13 sets the display size of the clipped image 62 according to the display size of the supplementary image 63 and the size of the display 22.

Then, the supplementary image setting section 16 performs supplementary image setting processing to make the setting of the supplementary image 63 (S35). The display size of the supplementary image is calculated from the size of the display 22 and the size of the clipped image 62 output from the clipped image setting section 13.

Specifically, the supplementary image setting section 16 sets the location, the size, the color and the like of the icons 65 based on the image map data (location information of the objects) stored in the storage 21 and the preset color information. The display control section 20 displays the output image 60 on the display 22 according to the setting values of the clipped image 62 and the supplementary image 63.

When the object detection is performed on all input frames to generate the image map data of all input frames, it is possible to update the supplementary image 63 in real time corresponding to each input frame as with the clipped image 62. It is not necessary to update the supplementary image 63 with respect to each input frame. Instead, the supplementary image 63 may be updated at every predetermined number of frames. In this case, for example, the supplementary image 63 may be updated corresponding to the timing of the object detection, e.g. at every predetermined number of frames such as every 10 frames.

In the example in FIG. 4 (2), the icons 65 have color information on the uniform of the corresponding players. For example, the user can understand that the black Y3 is located outside the clipped image 62 in the direction of lower left. Similarly, the black Y4 is located outside the clipped image 62 in the direction of upper right. The white Z3 is located outside the clipped image 62 in the direction of left. The white Z4 is located outside the clipped image 62 in the direction of lower right. The size (diameter of the circles in the example) of the icons 65 corresponds to the distance to the center of the clipped image 62 or the nearest edge of the clipped image 62. That is, the shorter the distance, the larger the size. For example, when comparing the white Z3 and the black Y3, the icon of the white Z3 is displayed in a larger size. By visually checking the icons 65 in the supplementary image 63, the user can understand the presence of players along with the uniform color, the direction and the distance of the players. Setting the supplementary image 63 and displaying it in the output image 60 along with the clipped image 62 as described above allows the user to immediately and visually understand information on the other players who are not displayed in the clipped image 62 (information on the non-clipped data area 53 in the input image 50). As a result, the user can understand the movement of the other players without changing or cancelling the digital zooming.

Other Examples of Supplementary Image

Figure 5:
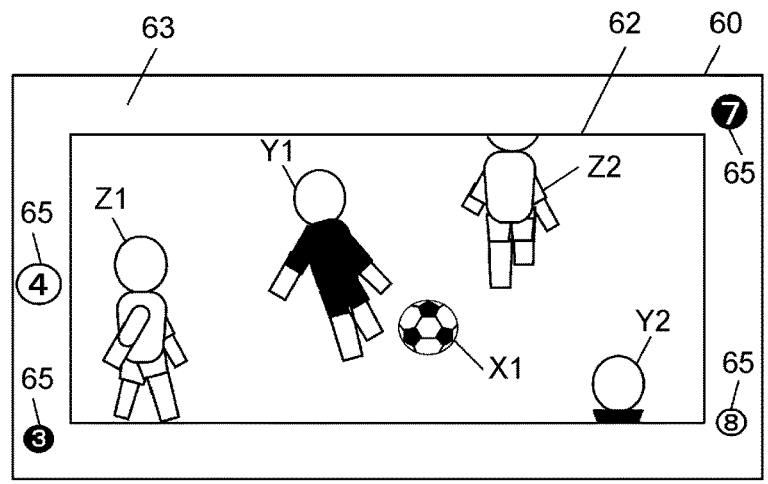
FIG. 5 (1) to FIG. 5 (3) illustrate another example of the output image.
Figure 5:
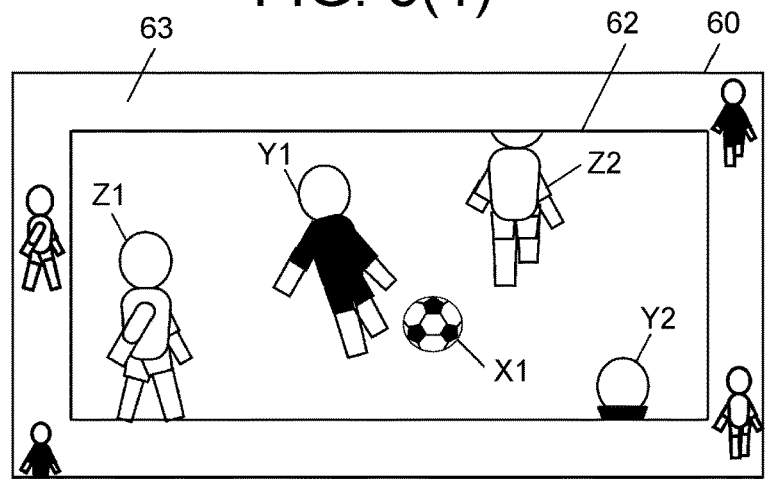
Figure 5:
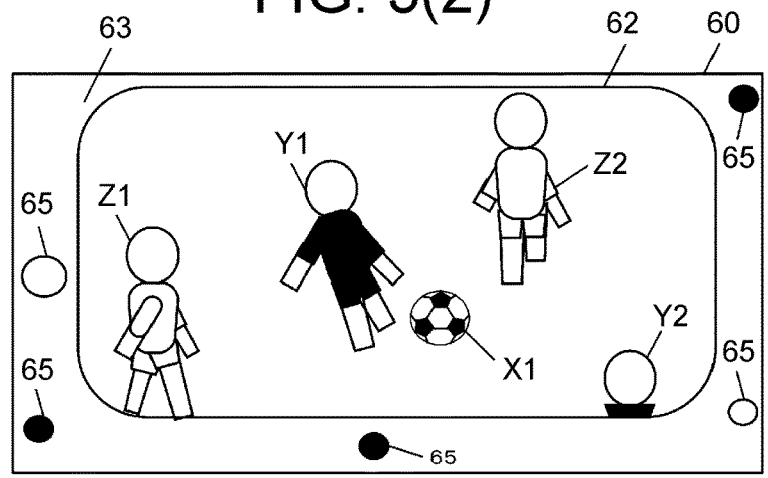

FIG. 5 (1) to FIG. 5 (3) illustrate other examples of the supplementary image.

FIG. 4 (2) illustrates an example in which figures (circular icons 65) resembling the subjects are displayed. However, the configuration of the supplementary image 63 is not limited thereto. The figures may be polygons or schematic images, symbols, numbers, characters, signs or the like resembling the subjects, or any combination thereof. The uniform numbers or the player names may be displayed corresponding to the subjects. FIG. 5 (1) is an example in which the circular icons 65 are rendered in different colors according to the teams of the players, and the uniform numbers are further shown in the icons 65.

Alternatively, deformed or compressed images of the corresponding areas in the non-clipped data area 53 of the input image 50 may be displayed as the supplementary image 63. Further, the supplementary image 63 may mimic an image captured with a fish-eye lens. When a compressed image is displayed, for example, the entire non-clipped data area 53 may be compressed at a predetermined compression ratio. The compression ratio may be lower at a location closer to the clipped data area 52 and higher at a further location. Alternatively, only the non-clipped data area 53 that includes the data on a detected subject may be compressed. The non-clipped data area 53 may be deformed or compressed according to the width of the supplementary image 63, e.g. into a vertically or horizontally long shape.

FIG. 5 (2) is an example in which a compressed image of the non-clipped data area 53 of the input image 50 is displayed instead of the icons 65. Compressed (reduced) images of the subjects, the white Z3, the black Y3, the black Y4 and the white Z4, are displayed in the supplementary image 63 at the locations corresponding to the respective locations in the non-clipped data area 53.

In addition to the icons 65 or the like, the supplementary image 63 may further include an area for displaying other information such as tickers and subtitles used in television broadcasts.

These display styles may be selectable by the user through the operation interface 26. Further, the display of the supplementary image 63 may be switchable between show and hide.

In FIG. 4 (2), the supplementary image 63 has the shape of the outer frame of the rectangular output image with a certain width that is uniform in all upper, lower, left and right sides. However, the shape is not limited thereto. For example, the four corners of the clipped image 62 may be rounded instead of a right-angle shape, and the supplementary image 63 is displayed in the area other than the clipped image 62 of the output image 60. Further, the display area of the supplementary image 63 may be changed according to the distribution of the detected objects in the input image 50. For example, it is not necessary to display the supplementary image 63 over the entire periphery (all four sides of the rectangle) of the output image 60. The area of the supplementary image 63 may be narrowed in the side where no preregistered object is detected compared to the other areas where the object is detected. The supplementary image 63 may be displayed only in the side where an object is detected. Alternatively, the display area of the supplementary image 63 may be expanded as the amount of data (the number of pixels) of the detected objects increases.

FIG. 5 (3) is an example in which the four corners of the clipped image 62 are rounded, and the width of the upper, lower, left and right display areas of the supplementary image 63 are changed according to the presence and the status of the detected objects. The width of the upper display area of the supplementary image 63 is narrowed compared to the other areas, which shows that no detected object is present in the upper side of the non-clipped data area 53 of the input image data. When an object is detected in the upper area of the non-clipped data area 53 in the next input frame or the input frame after predetermined frames, the width of the upper display area of the supplementary image 63 may be changed so that the detected object is displayed.

In the embodiment, the user can check the clipped data area 52 clipped from the input image and the supplementary image 63 on the display. The supplementary image 63 shows at least partial information on the non-clipped data area 53 which is the area other than the clipped data area 52 of the input image. Further, the clipped data area 52 is updated corresponding to the update of the input image, and the supplementary image 63 is updated corresponding to the update of the input image. Accordingly, the clipped data area 52 and the supplementary image 63 can be updated in synchronization with the update of the input image. This enables obtaining information on the area that is not displayed in the current output image from the input image and providing it to the user as additional information while allowing the user to continue viewing the output image.

2. Examples

Next, a smartphone 2, which is a kind of portable terminals or information display devices, will be described as an example of the electronic equipment that includes the above-described image processing device. However, it should be understood well that the examples of the present disclosure are not limited to the following example.

2-1. Functional Configuration

Figure 6:
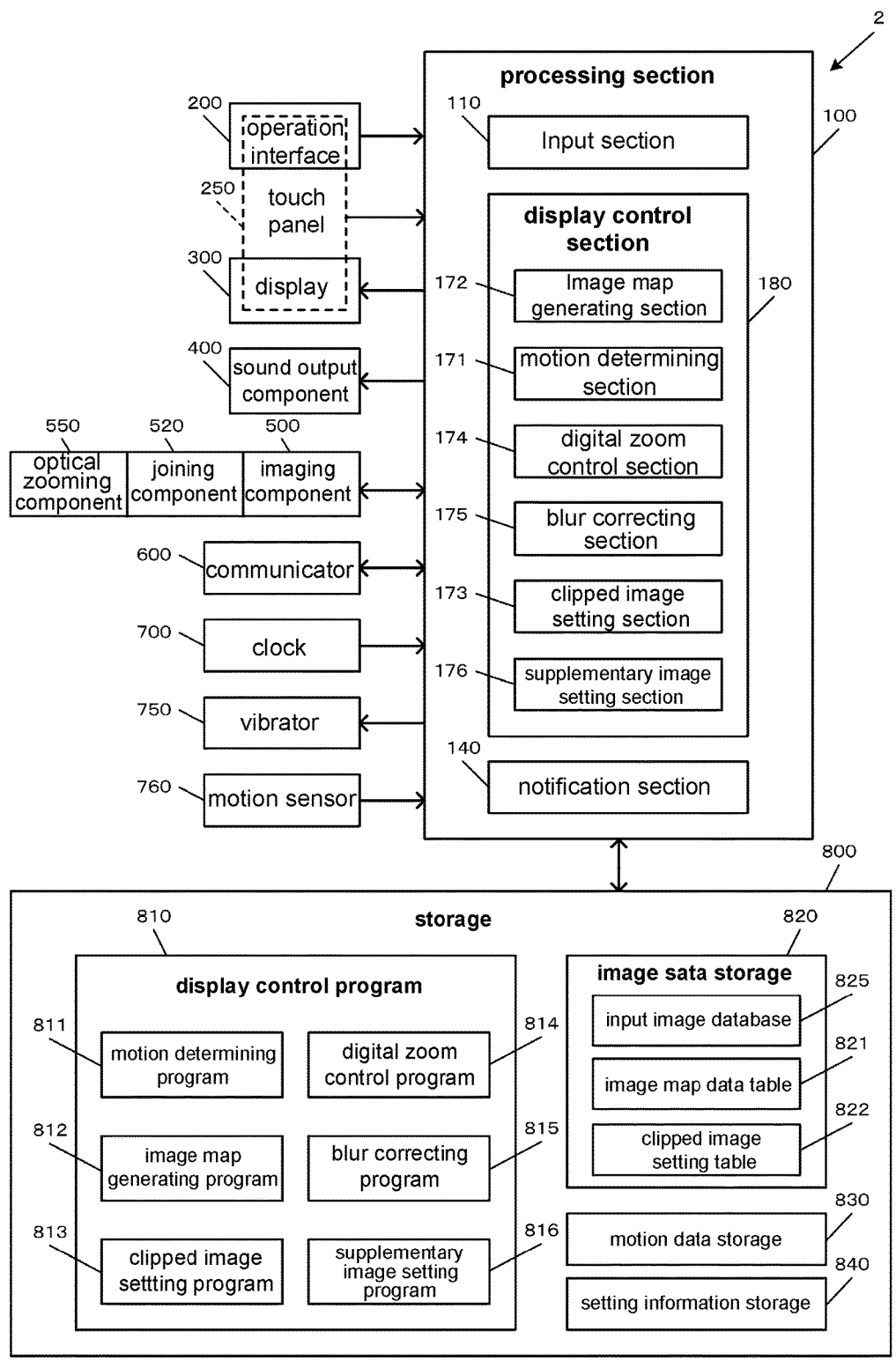
FIG. 6 is a block diagram of an example of the functional configuration of a smartphone.

FIG. 6 is a block diagram illustrating an example of the functional configuration of the smartphone 2 that includes the image processing device 1 of the embodiment.

The smartphone 2 includes a processing section 100, an operation interface 200, a display 300, a sound output component 400, an imaging component 500, a communicator 600, a clock 700, a vibrator 750, a motion sensor 760 and a storage 800.

The processing section 100 integrally controls the components of the smartphone 2 according to a variety of programs stored in the storage 800 such as a system program and performs a variety of processing related to image processing. The processing section 100 is constituted by a processor such as a CPU and a DSP, an integrated circuit such as an ASIC, and the like.

As main functional sections, the processing section 100 includes an input section 110, a display control section 180 and a notification section 140. The display control section 180 includes a motion determining section 171, an image map generating section 172, a clipped image setting section 173, a digital zoom control section 174, a blur correcting section 175 and a supplementary image setting section 176. These functional sections correspond to the respective functional sections of the image processing device 1 in FIG. 1.

The operation interface 200 includes an input device that allows the user to input a variety of operations to the smartphone 2, such as operation buttons and operation switches, or a touch pen or a mouse additionally connected to the smartphone 2. The operation interface 200 further includes a touch panel 250 integrally formed with the display 300. The touch panel 250 serves as an input interface between the user and the smartphone 2. The operation interface 200 output an operation signal to the processing section 100 according to a user operation.

The display section 300 is constituted by a display device that includes an LCD (liquid crystal display) and the like. The display section 300 displays a variety of information based on the display signal output from the processing section 100. The display section 300 is integrally formed with the touch panel 250 to constitute a touch screen. The display section 300 displays a variety of images such as photographed images.

The sound output component 400, which is constituted by a sound output device with a speaker or the like, outputs a variety of sounds based on a sound output signal output from the processing section 100.

The imaging component 500, which is constituted by an imaging device capable of capturing an image of an arbitrary scene, includes an imaging element such as a CCD (charge coupled device) imaging sensor or a CMOS (complementary MOS) imaging sensor. The imaging component 500 converts a light signal to an electric signal to output a digitized photographed image data to the processing section 100.

The communicator 600 is constituted by a communicating device for transmitting and receiving information to be used in the device to and from an external information processing device. The communicator 600 may be based on any of a variety of communication methods including wired connection via a cable compatible with a predetermined communication standard, connection via an intermediate device known as a cradle, which also serves as a charger, a wireless connection using a near field communication technique, and the like.

The clock 700, which is constituted by an internal clock of the smartphone 2, includes, for example, a quartz oscillator composed of a quartz resonator and an oscillating circuit. The time counted in the clock 700 is constantly output to the processing section 100.

The storage 800 is constituted by a storage device that includes a volatile or non-volatile memory such as a ROM an EEPROM, a flash memory and a RAM, and/or a hard disk drive, and the like. The storage 800 stores a system program for the processing section 100 to control the smartphone 2, as well as programs and data for a variety of image processing.

In the present example, the storage 800 stores a display control program 810 that is read and executed as a display control processing by the processing section 100. The display control program 810 includes a motion determining program 811, an image map generating program 812, a clipped image setting program 813, a digital zoom control program 814, a blur correcting program 815 and a supplementary image setting program 816 as sub routines.

The storage 800 includes an image data storage 820, a motion data storage 830 for storing information from the motion sensor 760 and a setting information storage 840 for storing information preset by the user. The image data storage 820 stores an input image data base 825 that stores image information of a photographed image input from the imaging component 500 to the processing section 100 as the input image, an image map data table 821 that stores an image map of the input image, and a clipped image setting table 822 which stores the setting information of the clipped image. In the input image database 825, past and current input image data is saved with respect to each input frame or every predetermined number of input frames.

The vibrator 750, which is constituted by a vibration generator including a motor and the like, generates a variety of vibrations based on a vibration generating signal output from the processing section 100. The vibrator 750 is used for vibrating the smartphone 2, which is an example of means for making a notification to the user.

The motion sensor 760 is capable of detecting motion information of the smartphone 2. The motion sensor 760 converts the motion information of the smartphone 2 to an electric signal and outputs it to the processing section 100.

The optical zooming component 550, which is constituted by an optical instrument with a telephoto lens, is connected to the imaging component 500 of the smartphone 2 by a joining component 520. In the following description, the optical zoom function is not used unless otherwise noted. However, it should be understood well that the same advantageous effects are obtained even when the optical zoom function is used.

2-2. Processing

An example operation of the smartphone 2 will be described with the images of a football game in FIG. 4 (1) and FIG. 4 (2) and FIG. 6 to FIG. 14.

Figure 7:
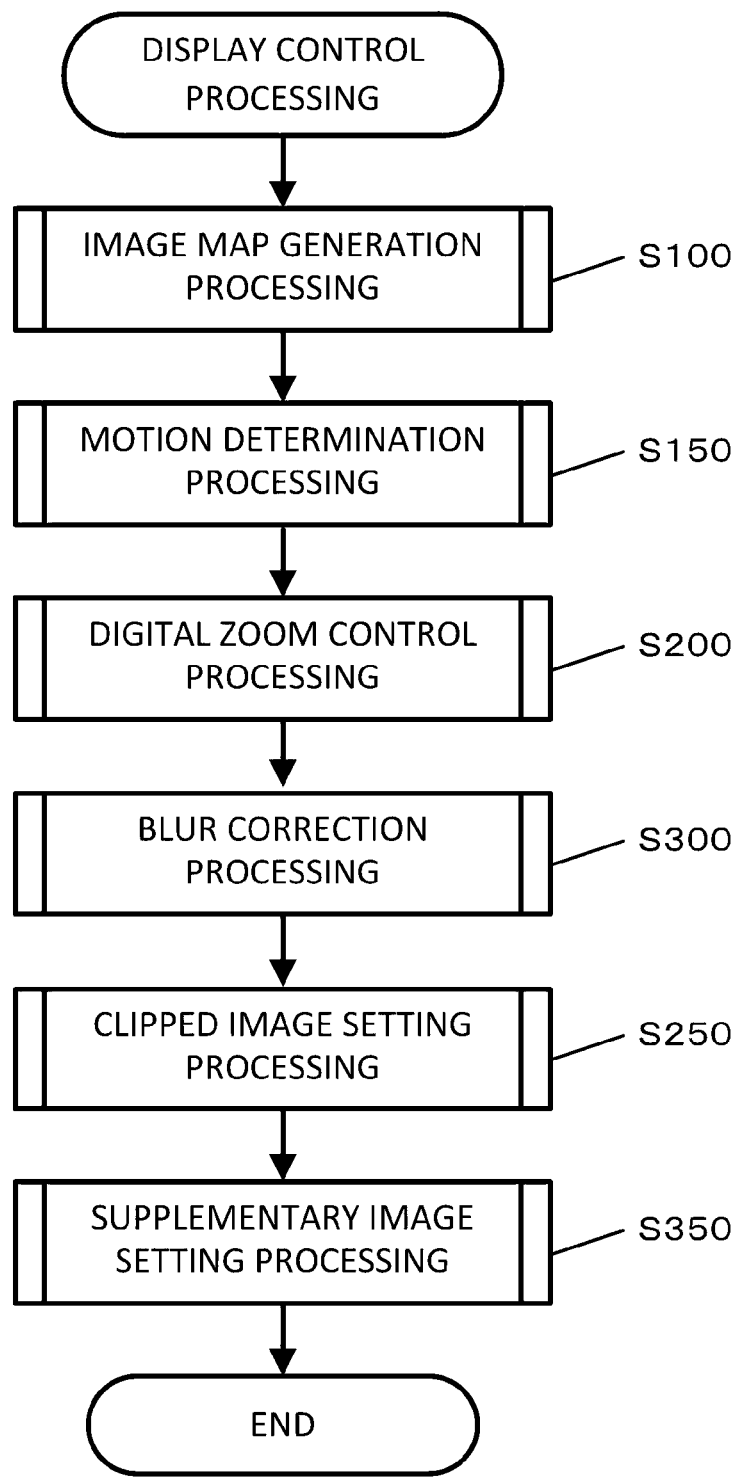
FIG. 7 is a flowchart illustrating an example of the flow of display control processing.

FIG. 7 is a flowchart illustrating an example of the flow of the display control processing. The display control processing is performed by the processing section 100 of the smartphone 2 according to the display control program 810 stored in the storage 800. The display control processing is performed when the user activates the application of the smartphone 2.

2-2-1. Image Map Generation Processing

First, the display control section 180 performs the image map generation processing (S100).

Figure 8:
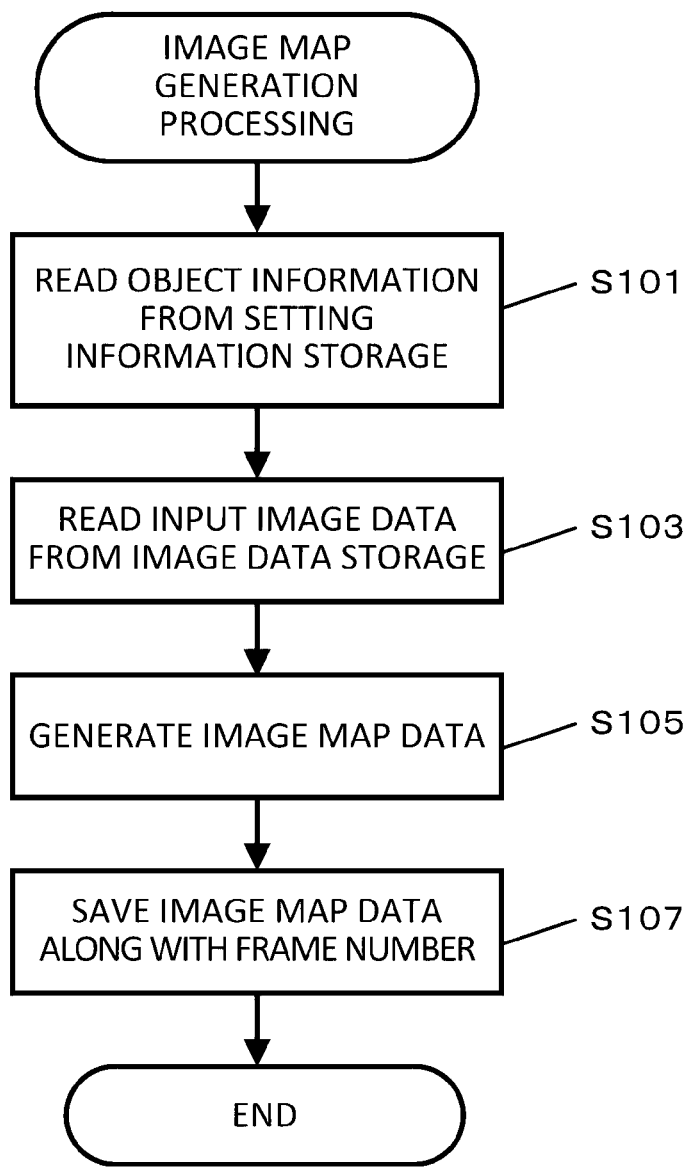
FIG. 8 is a flowchart illustrating an example of the flow of image map generation processing.

FIG. 8 is a flowchart illustrating an example of the flow of the image map generation processing. The image map generation processing is performed by the image map generating section 172 of the processing section 100 according to the image map generating program 812 stored in the storage 800.

First, the image map generating section 172 reads object information from the setting information storage 840 of the storage 800 (S101).

In the setting information storage 840, object information preset by the user, e.g. the color of a ball or uniform and the like, is stored. In the present example, information on a ball X and players Y in black uniform and players Z in white uniform (hereinafter referred to as blacks Y and whites Z) are stored in the setting information storage 840. Then, the image map generating section 172 reads image data (input frame) of the input image 50 from the input image data base 825 (S103).

Then, the image map generating section 172 performs object detection on each input frame based on the object information read in S101, e.g. color information preregistered by the user, to specify the location of detected objects so as to generate the image map data that includes the location information of the detected objects in the input frame (coordinate information of the detected objects in the input image data) (S105). The image map generating section 172 saves image map data thus generated in the image map data table 821 (S107), and the image map generation processing ends.

FIG. 9 illustrates an example of the image map data table 821 stored in the image data storage 820. As illustrated in FIG. 9, the location information of the ball X1, the blacks Y1 to Y4 and the whites Z1 to Z4 in the current input frame and past input frames are stored in the image map data table 821 along with time course information, in which the location information is linked to respective frame numbers. The location information is two-dimensional coordinate values in the X and Y directions with the origin point at the upper left of the input frame. The object detection and the subsequent storage of the location information may be performed on either each input frame or every predetermined number of input frames, e.g. every 10 frames. The origin point of the location information is not limited to the upper left and may be, for example, at the center point of the input frames. It is preferred that the digital zoom magnification is recorded along with the input frames.

In the above-described example, the image map generation section 172 performs the objects detection and obtains the location information of an object by means of image recognition based on the object information read in S101. Instead, the image map generating section 172 may obtain the location information of objects based on a signal from a satellite positioning part such as a GPS part attached to the object. Specifically, the GPS parts attached to the objects receive RF signals including a GPS satellite signal, which is a kind of positioning satellite signals, transmitted from a GPS satellite, which is a kind of positioning satellites. Then, the GPS parts capture the GPS satellite signal from the received RF signals, perform GPS calculation known in the art to calculate the location information and the like of the objects from the captured GPS signal and transmit the calculation results as GPS calculated signals. The GPS calculated signals are received by the communicator 600 of the smartphone 2 and output to the display control section 180. The image map generating section 172 converts the GPS calculated signals of the objects to the coordinate information of the objects in the input image data based on the ID information of the GPS parts that is preregistered in the setting information storage 840 corresponding to the object IDs, so as to generate the image map data. For example, in a football game, small GPS tags attachable to uniforms or shoes may be used as the GPS parts. In a car race, on-board GPS devices (GPS modules) may be used as the GPS parts. In an ordinary scene, the GPS devices (GPS modules) embedded in navigation devices installed in a variety of apparatuses and automobiles may be used as the GPS parts.

2-2-2. Motion Determination Processing

Back to FIG. 7, the display control section 180 performs the motion determination processing (S150). The motion determination processing is to determine the movement of the imaging component 500 (hereinafter referred to as the movement of the smartphone 2), which is performed by the motion determining section 171 of the processing section 100 according to the motion determining program 811 stored in the storage 800. The result of the motion determination processing is output to the digital zoom control section 174 and the blur correcting section 175 and used for making a determination as to whether to use the digital zoom function and selecting the level of the blur correction.

Figure 10:
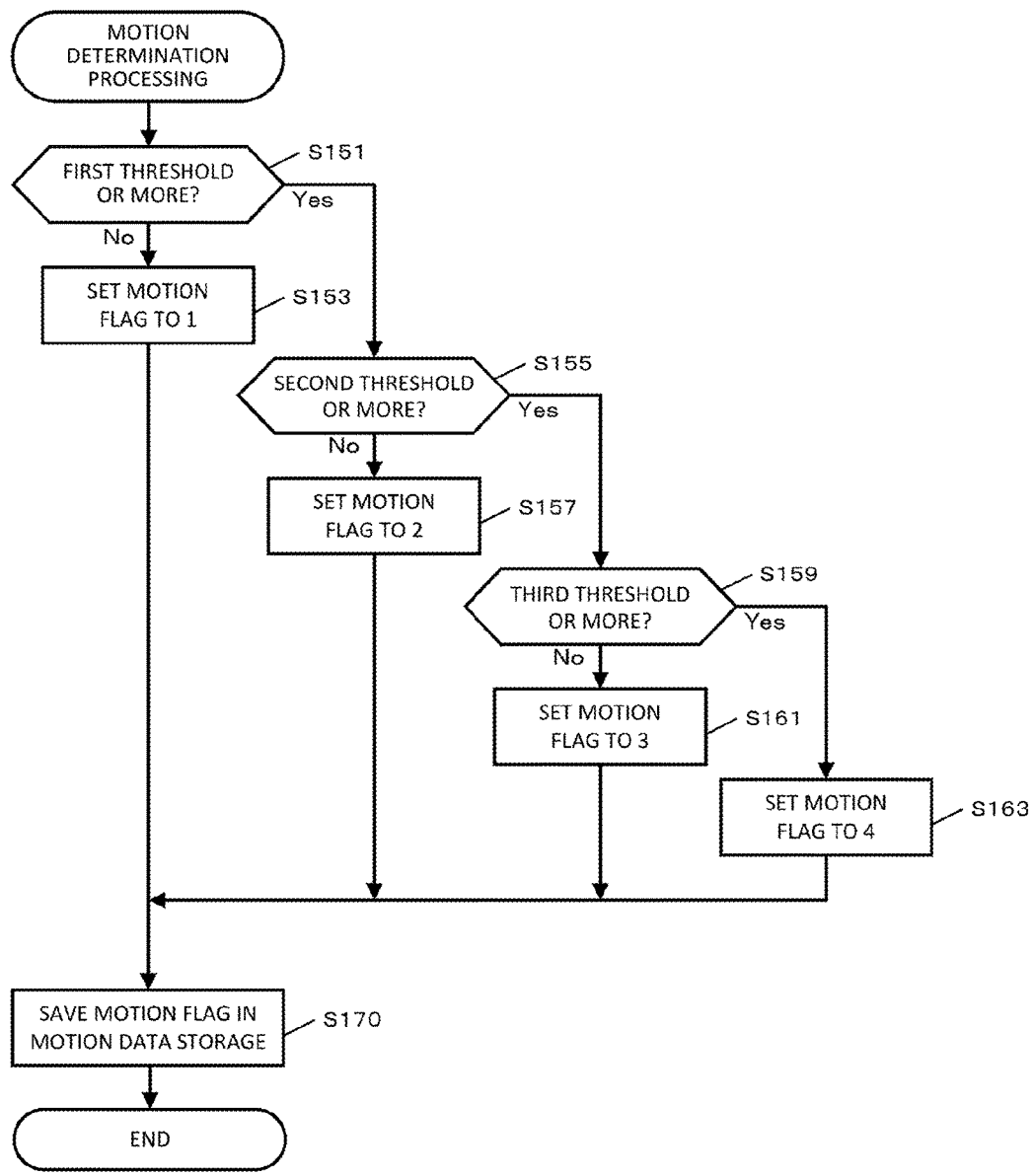
FIG. 10 is a flowchart illustrating an example of the flow of motion determination processing.
Figure 11:
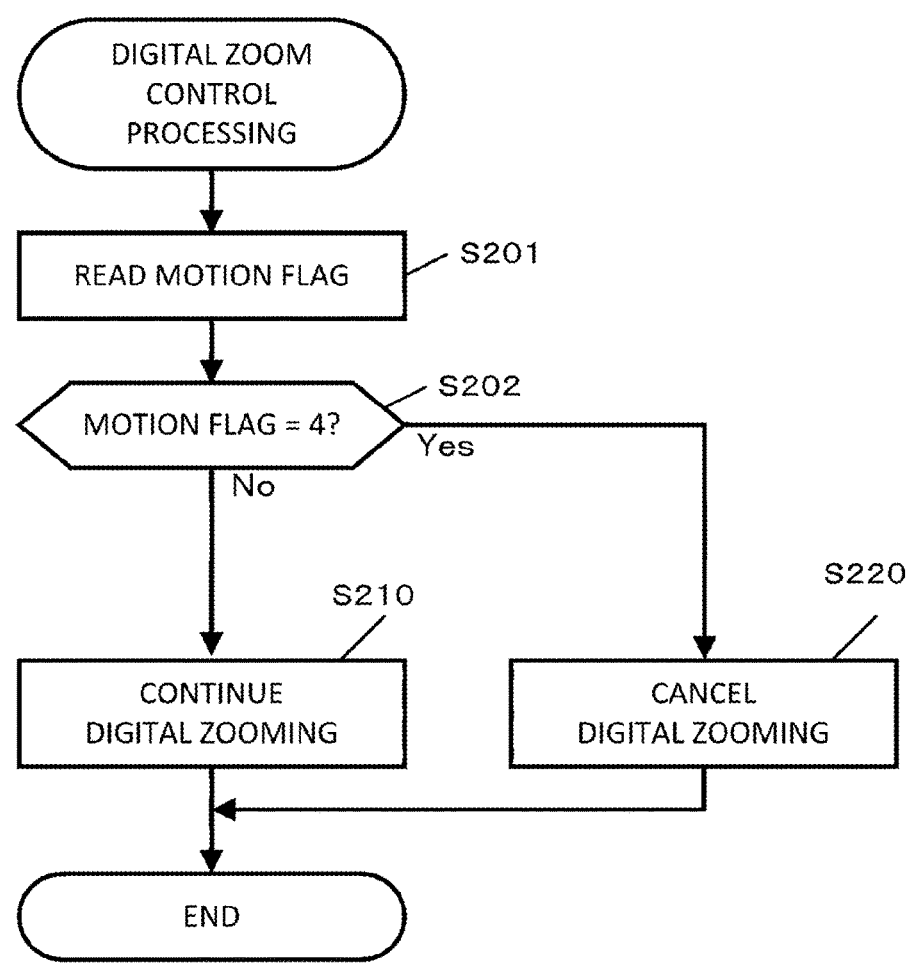
FIG. 11 is a flowchart illustrating an example of the flow of digital zoom control processing.

FIG. 10 is a flowchart illustrating an example of the motion determination processing. In the example, three thresholds are used as indicators of the degree of motion of the smartphone 2, which are set as third threshold>second threshold>first threshold. The thresholds may be set either for the output value of the motion sensor 25 or for the degree of motion calculated from the image data of input frames. The processing flow of grading the movement of the smartphone 2 as a motion flag of 1 to 4 and storing it in the motion data storage 830 will be described with FIG. 10.

Once the motion determining program 811 is executed, first, when the degree of motion of the smartphone 2 is less than the first threshold (S151, No), it is determined that the smartphone 2 is almost not in motion, and the motion flag is set to 1 (S153).

When the degree of motion of the smartphone 2 is equal to or greater than the first threshold (S151, Yes), a determination is made as to whether it is equal to or greater than the second threshold (S155). When the degree of motion is less than the second threshold (S155, No), the motion flag is set to 2 (S157). When the degree of motion of the smartphone 2 is equal to or greater than the second threshold (S155, Yes), a determination is made as to whether it is equal to or greater than the third threshold (S159). When the degree of motion is less than the third threshold (S159, No), the motion flag is set to 3 (S161). When the degree of motion is equal to or greater than the third threshold (S159, Yes), the motion flag is set to 4 (S163).

The motion determining section 171 saves the set motion flag information (motion flag 1, 2, 3 or 4) in the motion data storage 830, and the motion determination processing ends (S170). Instead of each of the frames, the motion determination may be made every predetermined number of frames (e.g. every 10 frames) It is preferred that the motion flag information is stored in the motion data storage 830 along with the corresponding frames on which the motion determination is performed.

Grading in Motion Determination

In the example in FIG. 10, the three thresholds (first to third thresholds) are used to perform the motion determination of the smartphone 2, and the motion flag is set to 1, 2, 3 or 4. The motion flags 1, 2, 3 and 4 represent respectively 1: almost not in motion (hereinafter referred to as fixed), 2: slightly in motion (hereinafter referred to as slight motion), 3: in rather large motion by a user panning/tilting action (hereinafter referred to as panning/tilting) and 4: in large motion by a user action to change the subject or the photographing scene (hereinafter referred to as scene change) It is possible to determine a movement as the above movement 1, 2, 3 or 4 with the correctly selected thresholds.

Thresholds of Degree of Motion

An example of the thresholds for determining the degree of motion of the smartphone 2 will be described. The following references for selecting the thresholds may be used alone or in combination.

1: Fixed (motion flag 1) assumes that, for example, the smartphone 2 is almost not in motion or fixed, and 2: slight motion (motion flag 2) assumes that the smartphone 2 is in motion but the movement is little, e.g. less than panning/tilting. The first threshold to distinguish between 1: fixed (motion flag 1) and 2: slight motion (motion flag 2) may be selected so as to be able to distinguish, for example, between a fixed state and a slight movement that is less than normal panning/tilting.

The second threshold to distinguish between 2: slight motion (motion flag 2) and 3: panning/tilting (motion flag 3) is selected based on a movement that is expected in a normal panning/tilting action. For example, when the degree of motion is determined with the image data of input frames that is captured in the photographing conditions of 1080× 1980-pixel resolution and 30 fps, the second threshold may be set to approximately 20 pixels/frame.

The third threshold to distinguish between 3: panning/tilting (motion flag 3) and 4: scene change (motion flag 4) may be set to approximately 50 pixels/frame when the photographing conditions are the same as those for the second threshold. The above description is for setting the thresholds for the calculated value of input frames. Instead, the thresholds may be set for the output value of the motion sensor 760 or for both the output information of the motion sensor 760 and the calculated value of input frames.

The thresholds may be set for the acceleration of the smartphone 2. 3: Panning/tilting (motion flag 3) assumes that the user moves the smartphone 2 to follow the movement of a certain subject, and the smartphone 2 moves at a stable and almost constant velocity in such movements (i.e. the acceleration is low). In contrast, 4: scene change (motion flag 4) assumes that the user moves the smartphone 2 quickly to a large extent to photograph another subject or another scene, and the change of velocity is drastic in such movements (i.e. the acceleration is high). That is, the third threshold may be set for the acceleration of the smartphone 2. In this case, when the acceleration is less than the third threshold, it is determined that the smartphone 2 is in the state of 3: panning/tilting (motion flag 3). When the acceleration is equal to or greater than the third threshold, it is determined that the smartphone 2 is in the state of 4: scene change (motion flag 4). The acceleration information may be calculated from the output information of the motion sensor 760 or from the velocity obtained from the image data of input frames.

The thresholds may be set for the number of pixels moved between image data of input frames. When the user is moving the smartphone 2 to follow the movement of a certain subject, the location of the pixels in the image data remains almost at the same between input frames. In contrast, when the user changes the subject of interest or the photographing scene, the location of the pixels in image data changes to a large extent between input frames. That is, the third threshold may be set for the number of pixels in the image data that move a predetermined value or more between input frames. In this case, when the value is less than the third threshold, it is determined that the smartphone is in the state of 3: panning/tilting (motion flag 3). When the value is equal to or greater than the third threshold, it is determined that the smartphone 2 is in the state of 4: scene change (motion flag 4).

The thresholds may be set for the subject information in the image data of the current and past input frames. As described above, the location information of a preregistered subject is recorded in the image map data table 821 along with the image frame numbers. That is, when a subject has no record of the location information, it is not present in the input frame images. When the information of a preregistered subject is recorded with a predetermined probability (e.g. 80%) in a predetermined number of frames (e.g. 60 frames), or when the information of the preregistered subject is successively recorded in a predetermined number of serial frames (e.g. 15 frames), it is determined that the subject is not changed, and the smartphone is in the state of 3: panning/tilting (motion flag 3). When there is no such record, it is determined that the subject or the scene is changed, and the smartphone is in the state of 4: scene change (motion flag 4).

In the above-described determination with the thresholds, it is not necessary to set the motion flag to 1, 2, 3 or 4 (S153, S157, S161, S163) immediately after the determination steps with the first to third thresholds (S151, S155, S159). Instead, the motion flag may be set when the smartphone 2 remains in the determined status for a predetermined period of time. This can prevent an erroneous user operation or the like from causing a wrong motion determination that does not reflect the user intention.

The user may be notified of the current determination result, i.e. 1: fixed, 2: slight motion, 3: panning/tilting or 4: scene change, made by the motion determining section 171.

This allows the user to know whether a motion determination reflects a user intention or not. Further, the user can learn what movement of the smartphone 2 is determined as panning/tilting or the like. When a notified motion determination result is not an intended one, the user can correct or stop the action of moving the smartphone 2.

The first to third thresholds may be changeable by the user. For example, when the user thinks the frequency of the status being determined as 2: slight motion, 3: panning/tilting or 4: scene change is too high, he/she can change the setting to increase the first, second or third threshold respectively.

The user may be allowed to manually switch the status among 1: fixed, 2: slight motion, 3: panning/tilting and 4: scene change through an operation on the operation interface 200 or the touch panel 250. For example, a button to switch the status between 1: fixed and 2: slight motion may be displayed on the touch panel 250 so that the user can switch the status between the status between 1: fixed and 2: slight motion through a tap operation with his/her finger. In the setting of the degree of motion of the smartphone 2 (motion flag), such user switching operations may be given priority over the determination by the motion determining section 171.

Since the movement of the smartphone 2 varies from user to user, changing the setting according to a user operation can improve the operability.

2-2-3. Digital Zoom Control Processing

Back to FIG. 7, the display control section 180 performs the digital zoom control processing (S200). The digital zoom control processing is performed by the digital zoom control section 174 according to the digital zoom control program 814 stored in the storage 800. The digital zoom control section 174 outputs the digital zoom magnification to the clipped image setting section 173, which is set by the user through the operation interface 200. The digital zoom control section 174 has a function of adjusting the digital zooming based on the motion flag value that is the motion information of the smartphone 2 output from the motion determining section 171.

It is difficult for the user to change the subject of interest or the photographing scene while viewing an enlarged output image 60 enlarged by means of the digital zoom function. The difficulty is higher as the magnification is higher. Therefore, it is desirable to automatically cancel the digital zooming or to automatically reduce the magnification to a predetermined value (e.g. 2×) in such cases. Hereinafter, the flow of the digital zoom control processing will be described with the flowchart of FIG. 11.

First, the digital zoom control section 174 reads the motion flag value from the motion data storage 830 (S201).

Then, the digital zoom control section 174 makes a determination as to whether the motion flag is 4 or not (S202). When the motion flag is not 4 (S202, No), i.e. the motion flag is any of 1 to 3, the digital zoom control section 174 maintains the digital zoom magnification at the current level (S210). When the motion flag is 4 (S202, Yes), i.e. the smartphone 2 is in the state of 4: scene change, the digital zoom control section 174 cancels the digital zooming (S220), and the output image 60 is zoomed out accordingly.

In the above description, the digital zooming is canceled when the motion flag is 4. Instead of canceling the digital zooming, the digital zoom control section 174 may reduce the magnification thereof to a predetermined level (e.g. 2×). Further, the digital zooming remains at the current magnification level when the motion flag is 1, 2 or 3. Instead, also when the motion flag is 3, i.e. the smartphone 2 is in the state of 3: panning/tilting, the digital zoom control section 174 may cancel the digital zooming or reduce the magnification thereof to a predetermined level as in the case of the motion flag being 4.

Even when the motion flag is 4 (S202), the digital zoom control section 174 does not have to immediately cancel the digital zooming or reduce the magnification thereof. The digital zoom control section 174 may perform the cancellation or reduction when the motion determining section 171 continuously outputs a motion flag value of 4 for a predetermined period of time. Alternatively, when the motion flag is 4, the motion determining section 171 may perform the motion determination processing again. This can prevent an erroneous motion determination or an erroneous user operation from causing a cancellation of the digital zooming or a reduction of the magnification thereof at a timing unwanted by the user.

2-2-4. Blur Correction Processing

Back to FIG. 7, the display control section 180 performs the blur correction processing (S300).

The blur correction processing is performed by the blur correcting section 175 according to the digital zoom control program 814 stored in the storage 800. The blur correction processing may be performed based on the technique disclosed in Patent Document 2. In the following description, the blur correction processing is performed on an image enlarged by digital zooming. However, it should be understood well that the same blur correction processing can be performed on an image enlarged by a combination of optical zooming and digital zooming or an input image 50 (optical output image).

It is expected that the user wants to view a subject of interest as a stable image without blur when he/she uses the telephoto function. In contrast, a telephotographic output image (telephotographic image) is largely affected by a user camera shake compared to output image without zooming (non-telephotographic image). With regard to the frequency range of the blur correction, the blur correction for a non-telephotographic image is typically effective only in a high frequency range including camera shakes. This means the blur correction is not effective in a low frequency range including slight movements of the smartphone 2 and the like. However, in order to obtain a stable telephotographic image, it is necessary to correct even a slight movement of the smartphone 2 that would not matter in a non-telephotographic image. Specifically, it is desirable that the blur correction for a telephotographic image is effective in a wider frequency range than that for a non-telephotographic image, i.e. in both the high frequency range including camera shakes and the low frequency range including slight movements and the like.

On the other hand, in the state of panning/tilting, it is desirable that the blur correction is effective not in the low frequency range including panning/tilting movements but only in the high frequency range including camera shakes so that the image follows the movement intended by the user.

To achieve this, it is preferred that the blur correction for a telephotographic image is switchable by the user or the blur correcting section 175 according to the photographing conditions between the following two modes: a blur correction mode having a stricter motion allowance level than for a non-telephotographic image (blur correction mode A, which is effective in both high and low frequency ranges and is used to stabilize the clipped image 62) and a blur correction mode that allows panning/tilting movements (blur correction mode B, which is effective only in the high frequency range and does not correct panning/tilting movements).

To restrict the frequency range of the correction, for example, a high-pass filter (hereinafter referred to as an HPF) is preferably used. An HPF is a filter that passes through frequency components higher than a specified cutoff frequency while cutting off frequency components lower than the cutoff frequency. When no HPF is used, the blur correction processing is effective throughout the frequency range from high frequency to low frequency. To make the blur correction effective only in the high frequency range including camera shakes, a high cutoff frequency, i.e. a high HPF coefficient is selected. To make the blur correction effective also in the low frequency range, a lower cutoff frequency, i.e. a lower HPF coefficient can be selected. By suitably changing the effective frequency range by means of an HPF, it is possible not to perform the blur correction on panning/tilting movements intended by the user so that the clipped image 62 follows the movement of the smartphone 2 while performing the blur correction on camera shakes so as to remove camera shake movements from the clipped image 62.

When the blur correcting section 175 automatically switches the blur correction mode, it may use the output value from the motion sensor 760 or the determination result (motion flag value) output from the motion determining section 171 to select the blur correction mode.

As an example, selection of the blur correction mode according to the degree of motion of the smartphone 2 (motion flag of 1, 2, 3 or 4) will be described. When the result of the motion determination is 1: fixed (motion flag 1), the blur correction is performed without an HPF or with an HPF having a lower coefficient than a coefficient when the result of the motion determination is 2): slight motion (motion flag 2) (blur correction mode A, stabilized). That is, the blur correction is performed at a higher motion allowance level than for a non-telephotographic image. This can expand the frequency range of the correction, and it is possible to obtain almost or completely stabilized clipped image 62. When the result of the motion determination is 3): panning/tilting (motion flag 3), the blur correction is performed with an HPF having a higher coefficient than in the state of 2): slight motion (motion flag 2) (blur correction mode B, panning/tilting allowed). That is, camera shake movements in the high frequency range are removed while panning/tilting movements are allowed. The frequency components lower than the cutoff frequency are cut off by the HPF and not subjected to the blur correction processing. In contrast, the frequency components higher than the cutoff frequency, including camera shakes, pass through the HPF and are subjected to the blur correction processing.

The flow of selecting the blur correction mode of the blur correction processing will be described with FIG. 12.

First, the blur correcting section 175 reads the motion flag value set by the motion determining section 171 from the motion data storage 830 (S251).

Then, the blur correcting section 175 makes a determination as to whether the motion flag is either 1 or 2 (S253). When the motion flag is 1 or 2 (S253, Yes), the blur correcting section 175 sets the blur correction mode to mode A (stabilized) (S255) and performs the blur correction. Then, the processing ends. When the motion flag is neither 1 nor 2 (S253, No), the blur correcting section 175 makes a determination as to whether the motion flag value is 3 (S260). When the motion flag is 3 (S260, Yes), the blur correcting section 175 sets the blur correction mode to mode B (panning/tilting allowed) (S265) and performs the blur correction. Then, the processing ends. When the motion flag is not 3 (S260, No), it is determined that the motion flag is 4. The processing ends without performing the blur correction (S270).

The display control processing may be configured not to perform the blur correction when the result of the motion determination is 4): scene change (motion flag 4) and the digital zooming is enabled since it is assumed that the user is moving the smartphone 2 to a large extent to change the subject or the scene. In this case, the determination as to whether the motion flag is 3 (S260 in FIG. 12) may be omitted. It is preferred to perform the blur correction when the user has finished the large movement and the motion flag value has changed from 4 to 3 or less.

It is preferred to automatically change the frequency range of the blur correction according to the digital zoom magnification. Specifically, the digital zoom control section 174 outputs the digital zoom magnification value to the blur correcting section 175. For example, the blur correcting section 175 decreases the cutoff frequency (decreases the HPF coefficient) according to the digital zoom magnification value. The blur correcting section 175 thus expands the frequency range of the blur correction as the magnification is increased.

As described above with FIG. 12, when it is determined that the smartphone 2 is in the state of 1: fixed (motion flag 1) or 2: slight motion (motion flag 2), the clipped image 62 is stabilized since the blur correction is performed in the blur correction mode A (stabilized). That is, the clipped image 62 remains stabilized unless the user moves the smartphone 2 to such a large extent that is determined as 3: panning/tilting (motion flag 3) or 4: scene change (motion flag 4). This means even when the user moves the smartphone 2 to follow the subject, the clipped image 62 cannot follow the movement of the subject.

To avoid this, the blur correcting section 175 may change the blur correction mode from the blur correction mode A (stabilized) to the blur correction mode B (panning/tilting allowed) when the user is highly likely to move the smartphone 2, e.g. when the center point of the clipped image 62 gets a predetermined distance away from the center point of the input image 50. This enables the clipped image 62 to follow the movement of the smartphone 2 even when the smartphone 2 is not moved to such a large extent that is determined as 3: panning/tilting (motion flag 3).

Alternatively, to avoid this, when the center point of the clipped image 62 gets a predetermined distance away from the center point of the input image 50 for example, the motion determining section 171 may lower the second threshold between 2: slight motion and 3: panning/tilting to a value with which the state is more likely to be determined as 3: panning/tilting (motion flag 3) than usual so that the blur correction mode is more likely to be changed from the blur correction mode A (stabilized) to the blur correction mode B (panning/tilting allowed). Changing the threshold in this way enables the clipped image 62 to follow the movement of the smartphone 2 even when the smartphone 2 is not moved to such a large extent that is determined as 3: panning/tilting (motion flag 3).

It is preferred that the motion determining section 171 cancels the lowered second threshold so that the blur correction mode is automatically changed from the mode B (panning/tilting allowed) to the mode A (stabilized) when the user moves the smartphone 2 again so that the center point of the clipped image 62 stays within the predetermined distance from the center point of the input image 50 for a predetermined period of time (e.g. 1 second).

While a method by lowering the second threshold is described, the same advantageous effect can be obtained in a method by changing the setting value of the blur correction mode. This method will be described in the following.

For example, the setting value of the blur correction mode is changed such that the frequency range of the blur correction is narrowed to less than the range in the state of 1: fixed (motion flag 1) so that slight motions included in 2: slight motion (motion flag 2) are allowed. Specifically, the blur correction mode is changed to a blur correction mode A2 (slight motion allowed) in which the cutoff frequency (HPF coefficient) is higher than in the blur correction mode A (stabilized) and lower than in the blur correction mode B (panning/tilting allowed) so that slight motions included in 2: slight motion (motion flag 2) are allowed.

That is, when the center point of the clipped image 62 gets a predetermined distance away from the center point of the input image 50, the blur correction mode is automatically switched to the blur correction mode A2 (slight motion allowed) in which the effective frequency range is narrower than the range in the state of 1: fixed (motion flag 1) toward the high frequency side (i.e. the cutoff frequency or the HPF coefficient is higher) so that the blur correction is not performed to low frequency components that are caused by slight motions included in 2: slight motion (motion flag 2). This enables the clipped image 62 to follow the movement of the smartphone 2 even when the smartphone 2 is not moved to such a large extent that is determined as 3: panning/tilting (motion flag 3).

When the user further moves the smartphone 2 to follow a subject after the blur correction mode is switched to the mode A2 (slight motion allowed) so that the smartphone 2 is consequently determined to be in the state of 3: panning/tilting (motion flag 3), the blur correction mode is automatically switched from the mode A2 (slight motion allowed) to the mode B (panning/tilting allowed). Further, it is preferred that when the user moves the smartphone 2 again after the blur correction mode is switched to the mode A2 (slight motion allowed) and the center point of the clipped image 62 stays within the predetermined distance from the center point of the input image 50 for a predetermined period of time (e.g. 1 second), the blur correction mode is automatically switched from the mode A2 (slight motion allowed) to the mode A (stabilized).

It is preferred that the display control section 180 displays a window in the output image 60, e.g. near the edge of the clipped image 62, to notify the user of the part of the input image 50 that corresponds to the clipped image 62 displayed in the display 300. For example, the display control section 180 may display the respective contours and center points of the input image 50 and the clipped image 62 in the window. Further, the display control section 180 may display a notification in the output image 60 that prompts the user to move the smartphone 2 when the clipping area of the clipped image 62 gets in a predetermined distance from the edge of the input image 50 or gets out of the input image 50.

2-2-5. Clipped Image Setting Processing

Figure 13:
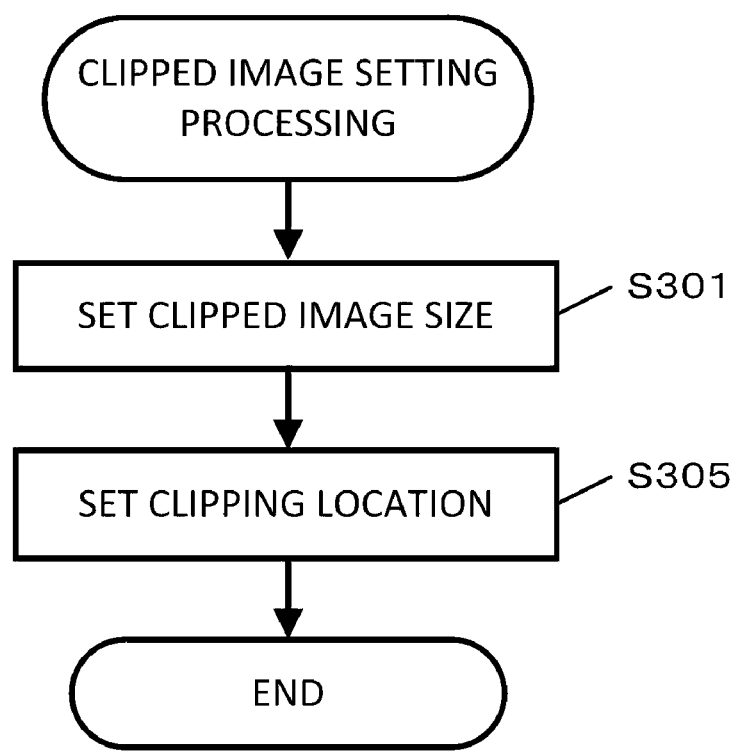
FIG. 13 is a flowchart illustrating an example of the flow of clipped image setting processing.

Back to FIG. 7, the display control section 180 performs the clipped image setting processing (S250). FIG. 13 is a flowchart illustrating an example of the flow of the clipped image setting processing. The clipped image setting processing is performed by the clipped image setting section 173 of the processing section 100 according to the clipped image setting program 813 stored in the storage 800.

The clipped image setting section 173 selects the size of the clipped data area 52 in the input image 50 according to the digital zoom magnification information output from the digital zoom control section 174 (S301). When the digital zoom magnification is 1×, the step S301 is omitted since the input image 50 (optical output) is congruent with the clipped data area 52.

Then, the clipped image setting section 173 selects the display size and the display position of the clipped image 62 in the output image 60 (S305) and outputs the setting information to the display 300. Then, the clipped image setting processing ends. The clipped data area 52 has a rectangular shape. For example, the clipped data area 52 is selected such that the center point thereof is coincide with the center point of the input image 50. Further, the clipped image 62 is selected such that the center point thereof is coincide with the center point of the output image 60. As a result, a subject around the center point of the input image 50 (optical output) is displayed around the center point of the output image 60 or the clipped image 62.

For example, the display size of the clipped image 62 may be 50% to 80% of the output image 60. The display size may be changeable by the user through an operation on the operation interface 200 or the touch panel 250.

Further, after the size of the supplementary image is selected in the supplementary image setting processing, which is described below, the clipped image 62 may be displayed in the area other than the supplementary image 63 of the output image 60.

2-2-6. Supplementary Image Setting Processing

Back to FIG. 7, the display control section 180 performs the supplementary image setting processing (S350).

Figure 14:
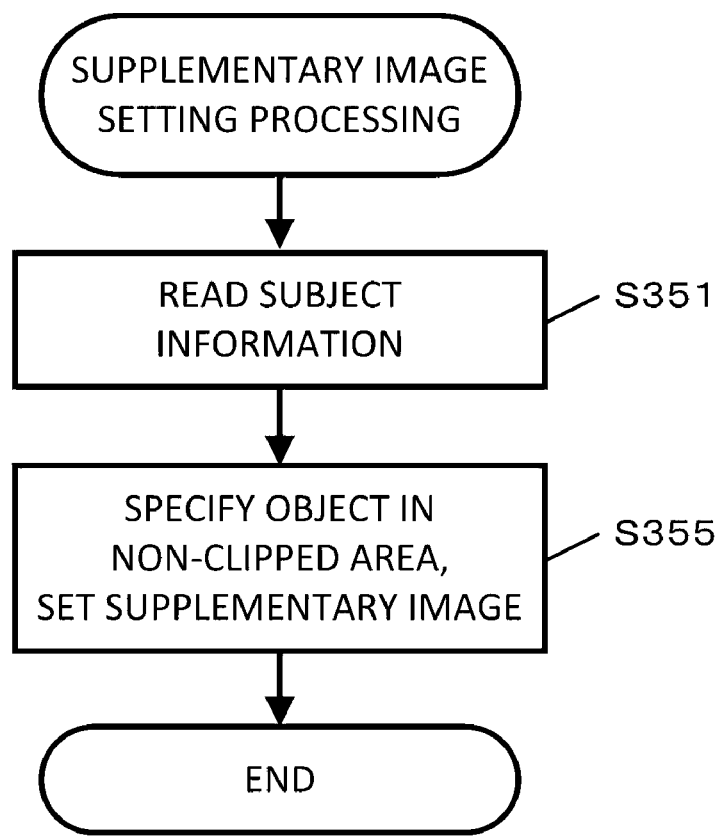
FIG. 14 is a flowchart illustrating an example of the flow of supplementary image setting processing.

FIG. 14 is a flowchart illustrating an example of the supplementary image setting processing. The supplementary image setting processing is performed by the supplementary image setting section 176 of the processing section 100 according to the supplementary image setting program 816 stored in the storage 800.

First, the supplementary image setting section 176 reads the object information stored in the image map data table 821 of the storage 800 (S351).

Then, the supplementary image setting section 176 sets the location and the icon 65 representing the type (human or not, etc.) and the color information with respect to each of the subjects that are located in the input image but outside the clipped image 62 (i.e. in the non-clipped data area 53) based on the read object information (S355), and outputs the setting information to the display 300. Then, the supplementary image setting processing ends.

Then, the display control processing in FIG. 7 ends.

3. Variation

It should be understood well that the examples of the present disclosure are not limited to the above-described present example, and a variety of changes can be suitably made without departing from the features of the present disclosure. Hereinafter, variations of the present example will be described. The same reference signs are denoted to the same components as those of the above-described present examples, and the repetitive description thereof is omitted.

3-1-1. Displaying Selected Subject in Clipped Image at Center

When watching a ball game, e.g. a football game, the user tends to view an enlarged image around the ball. To display the moving ball in the center area of the output image, the user has to move the smartphone 2 finely. However, the higher the digital zoom magnification, the more the output image 60 moves according to a slight movement of the user hand. This makes it difficult for the user to move the smartphone 2 correctly and increases the burden on the user.

To cope with the problem, the smartphone 2 may be configured to allow the user to select a subject in the clipped image 62 and to automatically display the selected subject in the center of the clipped image 62. This configuration will be described in more detail below with FIG. 15 (1A) to FIG. 15 (3B).

Figure 12:
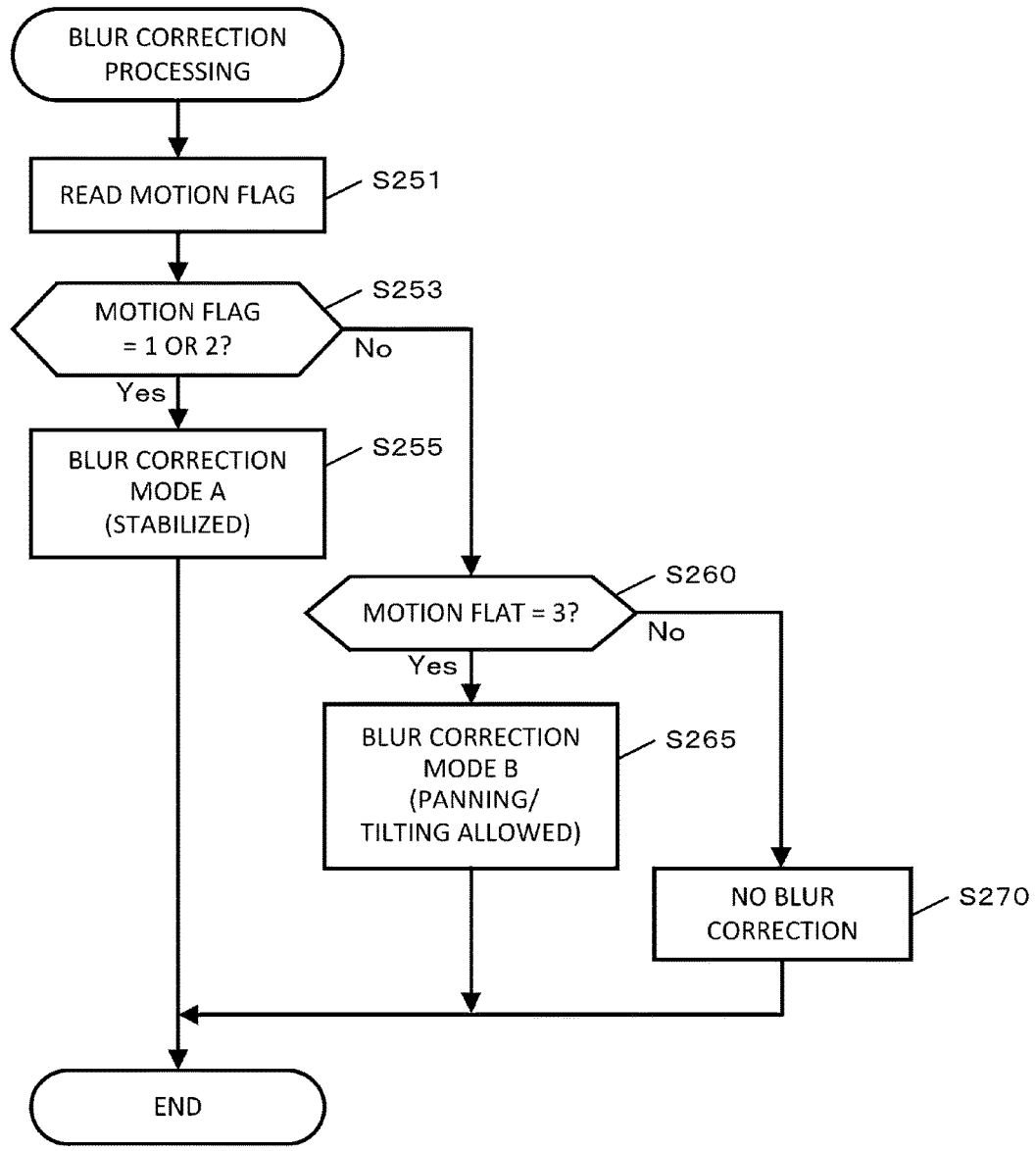
FIG. 12 is a flowchart illustrating an example of the flow of blur correction processing.
Figure 15:
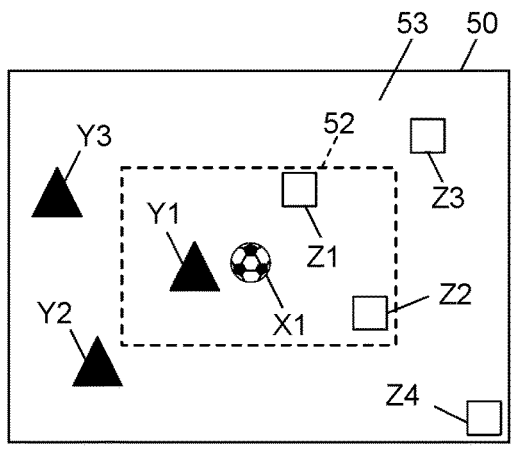
FIG. 15 (1A) to FIG. 15 (3B) illustrate an example of displaying a selected subject.
Figure 15:
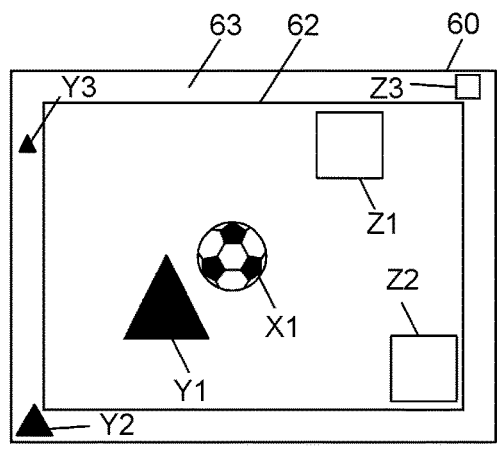
Figure 15:
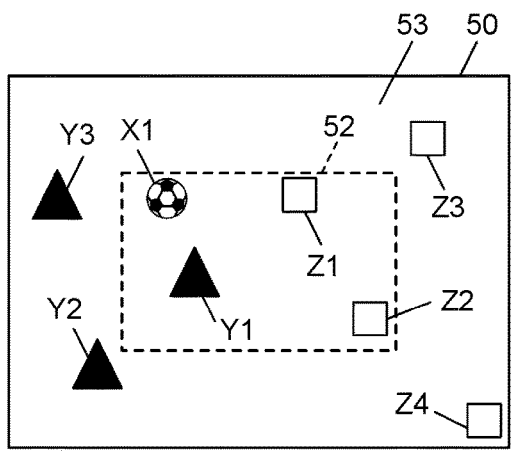
Figure 15:
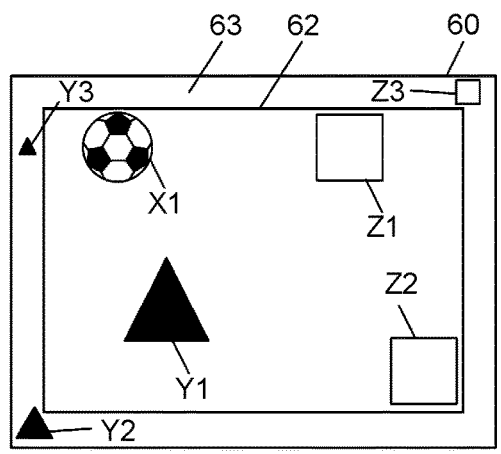
Figure 15:
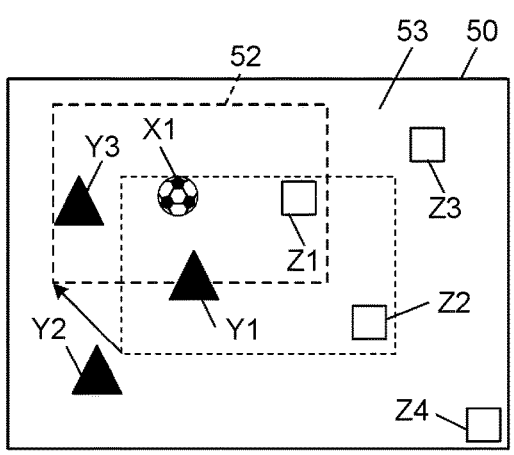
Figure 15:
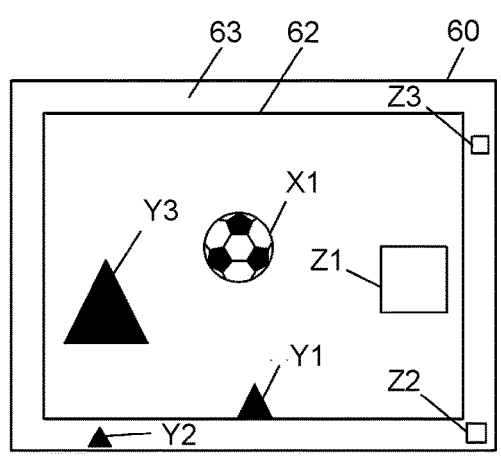

Suppose that the ball X1, which is located in the center areas of the input image 50 in FIG. 15 (1A) and the output image 60 in FIG. 12 (1B), is the subject that user wants to put in the center of the view.

As in the input image 50 in FIG. 15 (2A) and the output image 60 in FIG. 15 (2B), suppose that the ball X1 is moved toward the upper left of the clipped image 62. In this situation, the user selects the ball X1 through an operation on the operation interface 200 or the touch panel 250 (e.g. a tap on the ball X1 in the clipped image 62 with his/her finger) instead of moving the smartphone 2. The clipped image setting section 173 calculates the shifting direction and the shifting distance of the clipped data area 52 that brings the ball X1 selected by the user to the center area of the clipped image 62 from the current coordinate of the ball X1 in the input image 50 and the digital zoom magnification. The clipped image setting section 173 then shifts the clipped data area 52 according to the calculated value.

The input image 50 in FIG. 15 (3A) and the output image 60 in FIG. 15 (3B) are the result of shifting the clipped data area 52 by the above-described processing. As a result of shifting the clipping area in the input image 50 toward the upper left, the ball X1 is displayed in the center area of the clipped image 62.

3-1-2. Displaying Selected Subject in Supplementary Image at Center, Operation Guide Function Next, the smartphone 2 may be configured to allow the user to select a subject in the supplementary image 63 and to display the selected subject automatically in the center of the clipped image 62.

Figure 16:
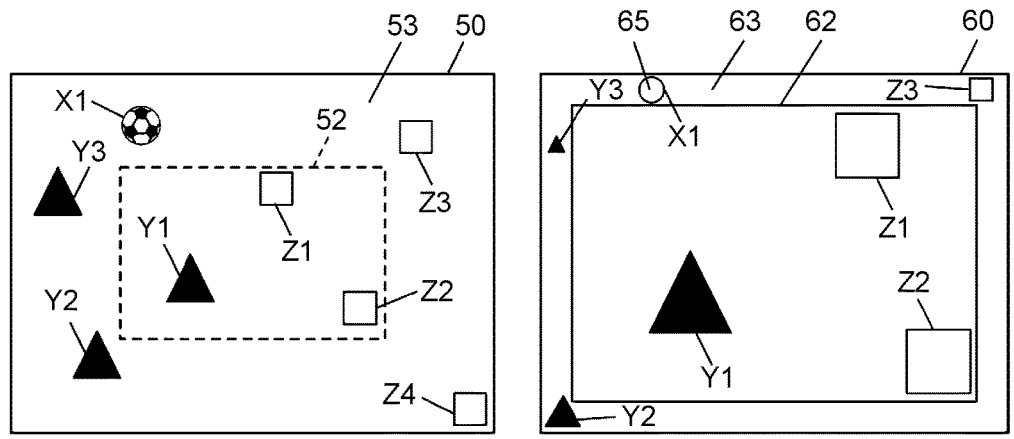
FIG. 16 (1A) to FIG. 16 (3B) illustrate another example of displaying a selected subject.
Figure 16:
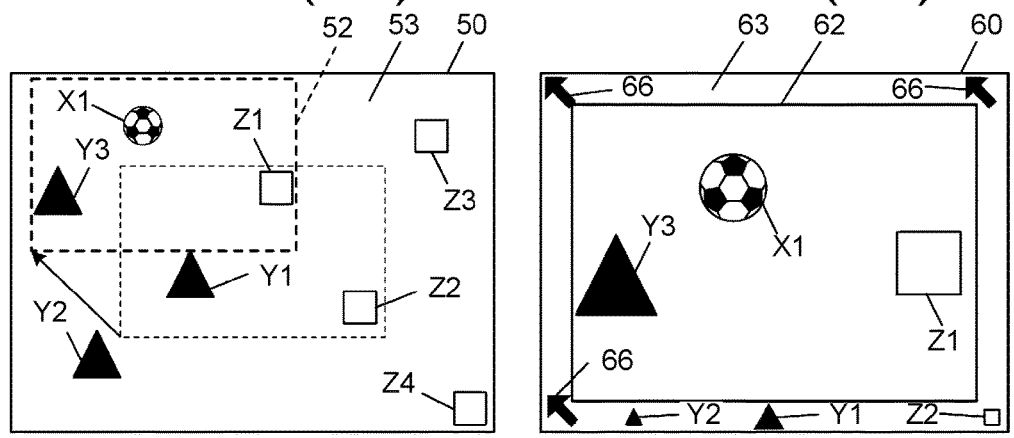
Figure 16:
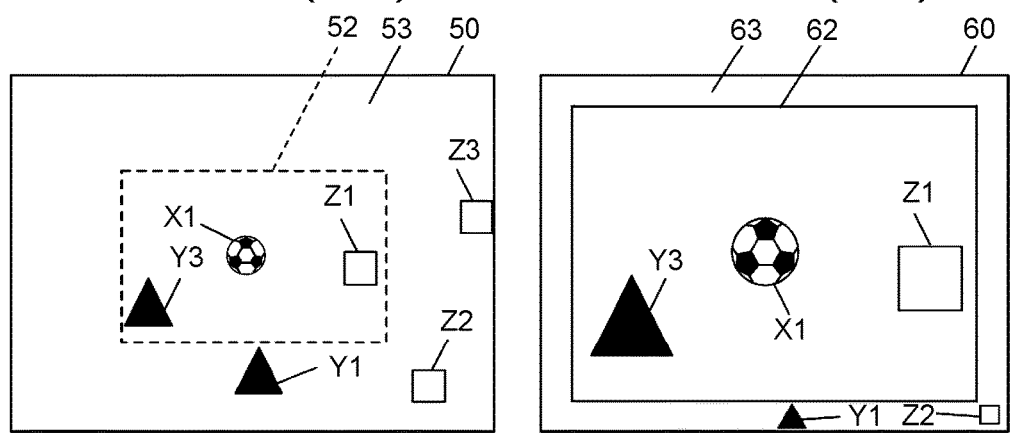

Suppose that the ball X1 in the input image 50 in FIG. 16 (1A) is not displayed in the clipped image 62 but in the supplementary image 63 as a white circle icon 65 in FIG. 16 (1B).

In this situation, the user selects the white circle icon 65 representing the ball X1 through an operation on the operation interface 200 or the touch panel 250 (e.g. a tap on the icon 65 in the supplementary image 63 with his/her finger) instead of moving the smartphone 2.

The clipped image setting section 173 calculates the shifting direction and the shifting distance of the clipped data area 52 that brings the ball X1 selected by the user to the center area of the clipped image 62 from the current coordinate of the ball X1 in the input image 50 and the digital zoom magnification. The clipped image setting section 173 then shifts the clipped data area 52 according to the calculated value.

The input image 50 in FIG. 16 (2A) and the output image 60 in FIG. 16 (2B) are the result of shifting the clipped image 62 by the above-described processing. As a result of shifting the clipping area in the input image 50 toward the upper left, the ball X1 is displayed in the clipped image 62. In this way, when a subject that the user wants to view is not displayed in the clipped image 62, he/she can select the icon 65 or the like in the supplementary image 63 instead of moving the smartphone 2 so that the selected subject is displayed in the clipped image 62.

Shift Area Limitation of Clipped Data Area

In the output image 60 in FIG. 16 (2B), the ball X1 is not displayed in the center area of the clipped image 62. This is because the shift of the clipped data area 52 is limited so that no data area is clipped from the input image 50. Without limitation, it is possible to display the ball X1 in the center area of the clipped image 62. However, no data area is also clipped from the input image 50 in this case, and the appearance of the output image 60 is therefore spoiled.

Displaying Operation Guide

To avoid this, the user can suitably move his/her hand holding the smartphone 2 toward the ball X1. In this case, it is preferred that the notification section 140 makes a notification that prompts the user to move the smartphone 2.

As an example of the notification, an operation guide of arrows indicating the direction to move the smartphone 2 are displayed in the supplementary image 63 in FIG. 16 (2B). The notification may be made as a text message in the output image 60 or a sound by the sound output component 400. The notification may also be made as a combination of these means.

As illustrated in an example of the supplementary image 63 in FIG. 5 (3), the notification may be made by changing the width of the supplementary image 63. In a side where the amount of data present in the input image 50 is less than a predetermined value, the width of the supplementary image 63 is narrowed or reduced to zero according to the amount of data in the side. The user who visually checks the width of the supplementary image 63 can understand the direction to move the smartphone 2.

The input image 50 in FIG. 16 (3A) and the output image 60 in FIG. 16 (3B) are the result of the user correctly moving the smartphone 2 according to the notification, in which the ball X1 is displayed in the center area of the clipped image 62.

Alternatively, to avoid clipping no data area of the input image 50 and spoiling the appearance of the output image, the digital zoom magnification may be automatically increased when the clipped data area 52 gets close the edge of the input image, e.g. the outer edge of the clipped data area 52 reaches the location (inner line) at a predetermined distance inside from the edge of the input image. Since the size of the clipped data area 52 that corresponds to the clipped image 62 is reduced, this can prevent no data area from being clipped from the input image 50.

In the above description, a subject selected by the user is displayed in the center of the clipped image 62. Instead of a subject, the user may be allowed to select an area in the clipped image 62, and the selected area may be displayed in the center of the clipped image 62. In this case, the user selects a desired area (e.g. a rectangular area) in the clipped image 62 through an operation on the operation interface 200 or the touch panel 250. Then, the same processing may be performed in which the center point of the area selected by the user is regarded as the ball X1.

In the above description, the user selects an area from the clipped image 62, and the selected area is displayed in the center of the clipped image 62. Instead, the user may be allowed to select an area from the input image 50.

In this case, a window may be displayed in the output image 60, e.g. near the edge of the clipped image 62, which notifies the user of the area in the input image 50 that corresponds to the clipped image 62 displayed in the display 300. For example, the respective contours and center points of the input image 50 and the clipped image 62 are displayed in the window. The user selects an area (e.g. a rectangular area) in the window through an operation on the operation interface 200 or the touch panel 250. The display control section 180 calculates the coordinate information of the area in the input image 50 that corresponds to the selected area in the window and further calculates the coordinate information that brings the center point of the clipped data area 52 to the center point of the selected area in the input image 50. The display control section 180 then outputs the calculated information to the clipped image setting section 173.

3-1-3. Notification of Selected Subject Location

As described in the image map generation processing, in the present example, the preregistered subject information is stored in the setting information storage 840, and the location information in the current and past input frames is stored in the image map data table 821. By using the information, it is possible to notify the user of the location of a particular subject selected by the user when it is present in the clipped image 62 or the input image 50.

For example, the user selects the ball X1 as a selected subject and registers it in the setting information storage 840. After the user starts photographing, the image map generating section 172 outputs a selected subject detection flag to the display control section 180 when the location information of the ball X1 is recorded in the image map data table 821. The display control section 180 outputs the location information of the selected subject and a notification processing command to the clipped image setting section 173 when the detected location of the selected subject is in the clipped data area 52 or to the supplementary image setting section 176 when the detected location of the selected object is in the non-clipped data area 53.

Figure 17:
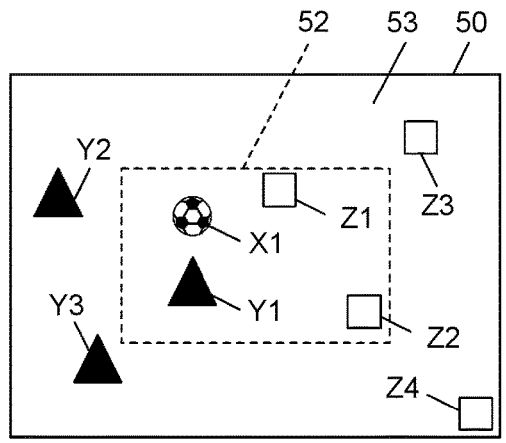
FIG. 17 (1A) to FIG. 17 (3B) illustrate an example of notifying a selected subject and displaying an operation guide.
Figure 17:
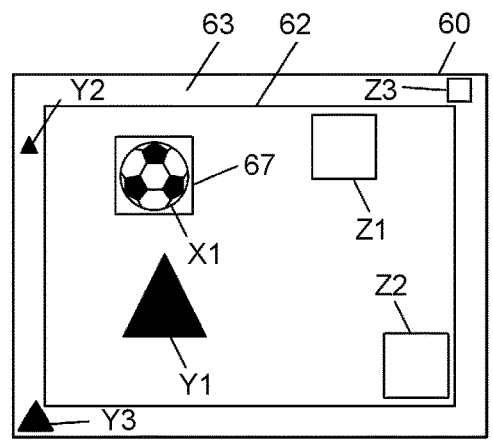
Figure 17:
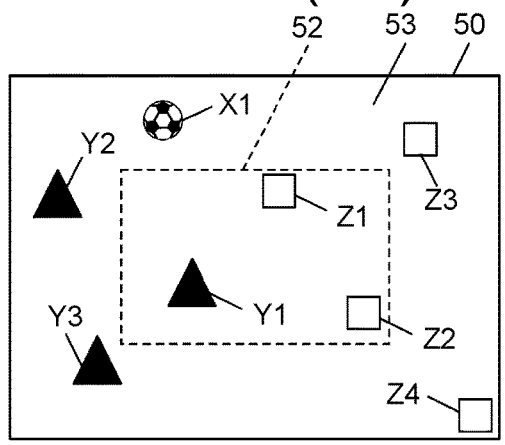
Figure 17:
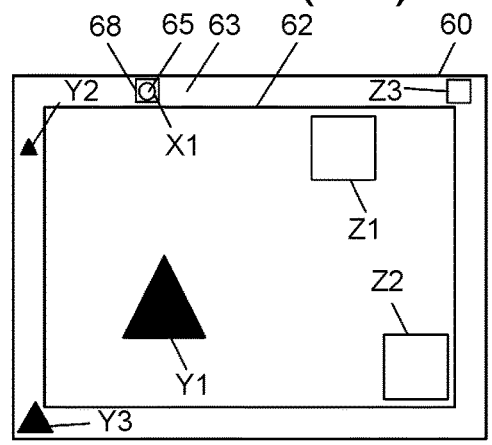
Figure 17:
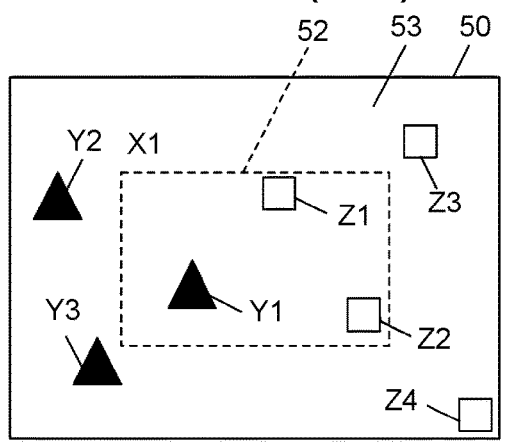
Figure 17:
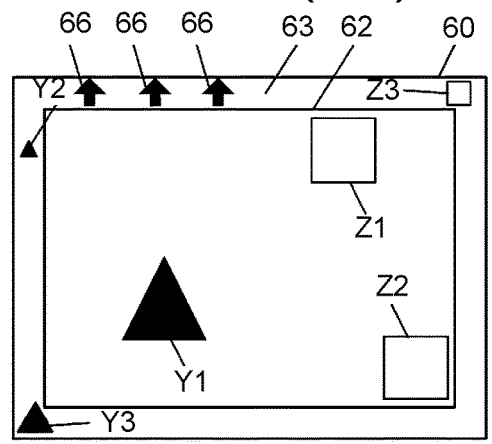

In order to notify the user of the presence of the selected subject in the clipped image 62, for example, the clipped image setting section 173 outputs setting information to the display 300 to render a rectangular frame that encloses the selected subject. FIG. 17 (1A) and FIG. 17 (1B) are the input image 50 and the output image 60 in which the notification is made. As illustrated in FIG. 17 (1A), the ball X1 as the selected subject is present in the clipped data area 52 of the input image 50. As illustrated in FIG. 17 (1B), a rectangular frame 67 is rendered around the ball X1.

In order to notify the user of the presence of the selected subject in the supplementary image 63, for example, the supplementary image setting section 176 outputs setting information to the display 300 to render a rectangular frame that encloses the icon 65 representing the selected subject. FIG. 17 (2A) and FIG. 17 (2B) are the input image 50 and the output image 60 in which the notification is made. As illustrated in FIG. 17 (2A), the ball X1 as the selected subject is present in the non-clipped data area 53 of the input image 50. As illustrated in FIG. 17 (2B), a rectangular frame 68 is rendered around the icon 65 representing the ball X1.

A selected subject that has been detected in the input image 50 may sometimes move out of the input image 50 due to an unexpected large movement of the subject. For example, when the subject unexpectedly moves fast, which can happen in the ball in a football game and the like, the selected subject may sometimes move out of the data area of the current input image 50. However, the smartphone 2 cannot cope with such a situation by the processing that shifts the clipped image 62 as illustrated in FIG. 15 (1A) to FIG. 15 (3B) since the data of the selected subject is not present in the current input image 50. The processing in the smartphone 2 for such situations will be described in the following with FIG. 17 (1A) to FIG. 17 (3B).

FIG. 17 (1A) and FIG. 17 (1B) illustrate the situation in which the ball X1 as the selected subject is present in the center area of the input image 50 and the output image 60.

FIG. 17 (2A) and the FIG. 17 (2B) illustrate the situation in which the ball X1 is located in the input image 50 but not displayed in the clipped image 62 of the output image 60. Instead, the white circle icon 65 resembling the ball X1 is displayed in the supplementary image 63.

In this situation, it is possible to display the ball X1 in the clipped image 62 by shifting the clipped image 62 since the ball X1 is located in the input image 50.

FIG. 17 (3A) and FIG. 17 (3B) illustrate the situation in which the ball X1 is neither present in the input image 50 nor displayed in the output image 60. When the display control section 180 detects the absence of the ball X1 as the selected subject in the input image 50, it reads the location data of the ball X1, e.g. the data relating to the movement of the ball X1 in the last several seconds, from the image data of the past frames stored in the image map data table 821 of the storage 800.

Then, the display control section 180 uses the read past location data to determine that the ball X1 is currently located in the direction of the trajectory calculated from the coordinates of the ball X1 in the last several seconds or in the direction of the latest detected location of the ball X1. Then, the display control section 180 outputs the estimated direction of the current location of the ball X1 to the notification section 140 and the supplementary image setting section 176 as operation guide information. For example, the notification section 140 and the supplementary image setting section 176 display the operation guide 66 in the supplementary image 63 to prompt the user to move the smartphone 2 upward as illustrated in FIG. 17 (3B).

According to this notification, the user can effectively move the smartphone 2 to display the ball X1 as the selected subject in the output image 60 again without cancelling the digital zooming nor reducing the zoom magnification while continuously viewing the output image 60.

3-2. Return to Location of Interest

When the user aims the smartphone 2 at a certain location to view a telephotographic image for a predetermined period of time or more, he/she can be regarded to pay attention to the location. It is highly probable that he/she will view the location (hereinafter referred to as a location of interest) in the future too. For example, the degree of attention can be determined based on the elapsed time or the number of input frames in which the smartphone 2 in digital zooming is determined as being not in motion in the motion determination processing (S150) (i.e. as being in the state of 1: fixed (motion flag 1)). That is, when the user views the telephotographic image of a certain location for a predetermined period of time (e.g. 15 seconds) or a predetermined number of input frames (e.g. 450 frames), the viewing location is determined as a location of interest. The image information of the output image 60 of the location is then saved in the image data storage 820 as image-of-interest information (scene-of-interest information). Alternatively, when the digital zooming is cancelled so that the output image 60 is zoomed out, the previous output image 60 immediately before the cancellation may be automatically saved as the image-of-interest information. The cancellation of the digital zooming may be made either according to a user operation or the result of the above-described determination by the motion determining section 171 and the digital zoom control section 174 based on the motion flag.

After the image-of-interest information is saved, when the user moves the smartphone 2 to a large extent to change the subject or puts down his/her hand holding the smartphone 2 to rest the hand, the digital zooming is automatically cancelled according to the result (4: scene change (motion flag 4)) of the determination by the motion determining section 171 and the digital zoom control section 174 based on the motion flag. The output image 60 is then zoomed out accordingly.

Thereafter, when the user stops the movement of the smartphone 2 so that the smartphone 2 is determined as being in the state of 1: fixed (motion flag 1), the processing section 100 automatically applies the last digital zoom magnification before zooming out to the current clipped image 62. That is, every time the result of the motion determination indicates a change of the state from 4: scene change (motion flag 4) to 1: fixed (motion flag 1), the processing section 100 returns the digital zoom magnification from 1× to the last magnification before zooming out (hereinafter referred to as a magnification return function). The last digital zoom magnification before zooming out may be read from the image map data table 821. Instead of immediately after the state is determined as 1: fixed (motion flag 1), the processing section 100 may return the magnification after the smartphone 2 remains in the state for a predetermined period of time or a predetermined number of frames. Further, instead of returning the magnification back to the last magnification before zooming out, the processing section 100 may change the magnification to a preset magnification (e.g. 2× magnification).

Suppose that the user views an image at a location of interest, the image-of-interest information is saved, and thereafter the user moves the smartphone 2 to change the subject and then further moves the smartphone 2 back to the original location of interest. The processing flow of the magnification return function in this situation will be specifically described First, when the user views the image of a certain location at a digital zoom magnification of 2× for a predetermined period of time, the image-of-interest information is saved. Then, when the user moves the smartphone 2 to a large extent to change the subject so that the state is determined as 4: scene change (motion flag 4), the processing section 100 automatically zooms out the clipped image 62 (to 1× magnification). Subsequently, when the user stops moving the smartphone 2 so that the state is determined as 1: fixed (motion flag 1), i.e. when the user starts to view another subject, the processing section 100 automatically applies the previous digital zoom magnification (2× in this case) to the current clipped image 62.

Thereafter, when the user moves the smartphone to a large extent to view the image of the original location of interest again so that the state is determined as 4: scene change (motion flag 4), the processing section 100 automatically zooms out the clipped image 62 (to 1× magnification). When the user stops moving the smartphone 2 around the location of interest so that the state is determined as 1: fixed (motion flag 1), the processing section 100 automatically applies the previous digital zoom magnification (2× in this case) to the current clipped image 62. As a result, the clipped image 62 is switched from a zoomed-out image to an image digitally zoomed at the previous magnification (telephotographic image).

Subsequently, the processing section 100 calculates the difference between the current clipped image after the magnification return processing and the clipped image 62 saved in the image data storage 820 as the location-of-interest information with respect to each pixel. When there are a predetermined amount or more of pixels in which the difference is equal to or less than a predetermined value, the processing section 100 determines that the smartphone 2 has returned to the location of interest. The processing section 100 then performs the location of interest return processing. Specifically, the processing section 100 shifts the clipped data area 52 to align the current clipped image 62 with the clipped image 62 of the location of interest. This facilitate returning the image to the location of interest.

In the above description, the processing section 100 automatically performs the alignment. Instead, for example, the processing section 100 may generate a contour of the clipped image 62 of the location of interest by edge detection and overlay the generated contour on the current clipped image 62 at a predetermined opacity (e.g. 50%) so as to make a notification that prompts the user to move the smartphone 2. In this case, the user may roughly align the location according to the notification, and thereafter the processing section 100 may perform the alignment.

Return Processing Based on Input Image Information it is also possible to perform the return processing without using the magnification return function as follows by using the input image information. When the input image is used, input image information at the location of interest may be saved as the location-of-interest information.

After the input image information and the digital zoom magnification information are saved as the image-of-interest information, when the user moves the smartphone 2 to a large extent to change the subject or puts down his/her hand holding the smartphone 2 to rest the hand, the digital zooming is automatically cancelled according to the result (4: scene change (motion flag 4) of the determination by the motion determining section 171 and the digital zoom control section 174 based on the motion flag. The output image 60 is then zoomed out accordingly.

Thereafter, when the user moves the smartphone 2 near the original location of interest before zooming out and then stops the movement so that the state is determined as 1: fixed (motion flag 1), the processing section 100 calculates the difference between the current input image 50 and the input image 50 at the location of interest saved in the image data storage 820 with respect to each pixel. When there are a predetermined amount or more of pixels in which the difference is equal to or less than a predetermined value, the processing section 100 determines that the smartphone 2 has returned to the location of interest. The processing section 100 then performs the location of interest return processing. Specifically, the processing section 100 shifts the clipped data area 52 and selects the digital zoom magnification to align the current output frame with the output frame at the location of interest. This facilitate returning the image to the location of interest.

In the above-description, the processing section 100 automatically performs the alignment and the selection of the digital zoom magnification. Instead, the processing section 100 may generate a contour of the output frame image of the location of interest by edge detection and overlay the generated contour on the current output frame image at a predetermined opacity (e.g. 50%) so as to make a notification that prompts the user to move the smartphone 2. In this case, the user may roughly align the location and change the digital zoom magnification according to the notification, and thereafter the processing section 100 may perform the alignment.

In addition to calculating the difference in pixels, the processing section 100 may detect a moving object and exclude the area of the detected moving object from the calculation of the difference. This can improve the accuracy of the calculation of the difference since the movement of pixels caused by a moving object such as human and vehicles is excluded from the calculation of the difference.

Instead of the difference in pixels, the characteristic points in the input image 50 of the location of interest may be extracted and used for matching with the characteristic points in the current input image 50 as return processing to the location of interest. In a football game for example, it is preferred to use the characteristic points of fixed subjects such as a goal post and the fence of a stadium for the matching. To achieve this, for example, the motion vector of the characteristic points may be calculated, and characteristic points with small motion vector may be emphasized in the matching. That is, among detected characteristic points, only characteristic points having a motion vector with a predetermined value or less may be used, or characteristic points having a motion vector with a predetermined value or less may be weighed greater than the other characteristic points in the matching.

When information on two or more location-of-interest images is stored in the image data storage 820, the above determination may be made sequentially in chronological order from the latest location of interest image. Further, the user may be asked to put a label when storing the location-of-interest information. The user who wants to return the image to a location of interest can select the corresponding label so that a desired location of interest is read for the above-described processing.

3-3. Exclusion of Unintentional Object

When viewing a telephotographic image, an unintentional object may sometimes be displayed in the output image 60. As the magnification is higher, such an unintentional object occupies a larger percentage of the output image 60 and gives the user a greater sense of discomfort even if the object is displayed for a very short period of time. A processing for avoiding this will be described in the following.

To determine as to whether there is an output frame that includes an unintentional object, an edge map is generated with respect to each output frame, and the generated edge map is aligned and compared with the edge maps of the previous and next frames. For example, the image map generating section 172 generates the edge maps.

First, a determination is made as to whether there are a predetermined number or more of pixels in which the difference is equal to or greater than a predetermined value or more between a target frame and the previous frame and between the target frame and the next frame (first determination). The first determination is to detect whether there is a change between frames.

When it is determined in the first determination that there is a change between frames, the difference between the two frames adjacent to the target frame, i.e. the previous and next frames of the target frame, is calculated with respect to each of the pixels in the area in which the change is detected in the first determination. Then, a determination is made as to whether there are a predetermined number or more of pixels in which the difference is equal to or greater than a predetermined value (different from the predetermined value of the first determination) (second determination). That is, the second determination is to determine as to whether there is an unintentional object between the previous and next frames of the target frame in the area detected in the first determination. When it is determined in the second determination that there are a predetermined number or more of pixels, the unintentional object is present only in the detected area of the target frame. Therefore, it is possible to replace the pixels in the area with the corresponding pixels in the previous or next frame.

The edge map may be generated based on both brightness and color saturation or only brightness. The latter case ignores the color saturation. However, since human eyes are insensitive to a change of color saturation, the user would seldom find an appearance of such an unintentional object. Further, excessive recognition of an unintentional object and resultant excessive processing can be avoided.

Figure 18:
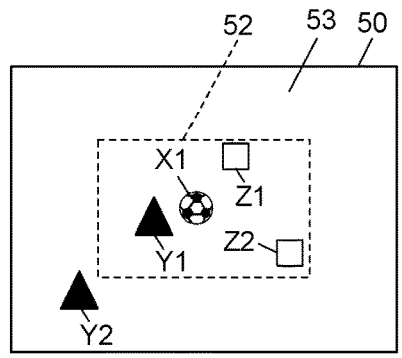
FIG. 18 (1A) to FIG. 18 (4B) illustrate an example of the input image and the output image in unintentional object exclusion processing.
Figure 18:
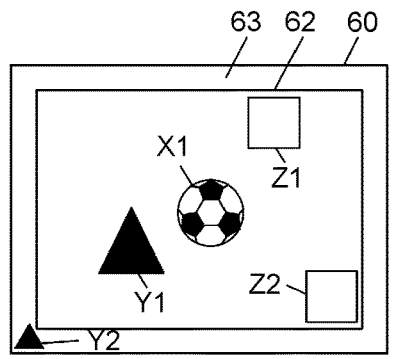
Figure 18:
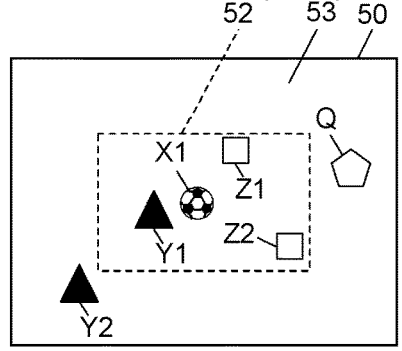
Figure 18:
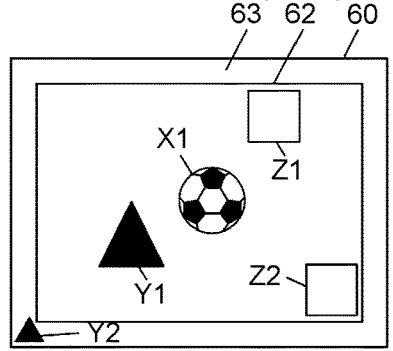
Figure 18:
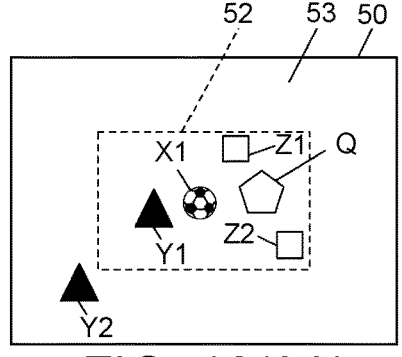
Figure 18:
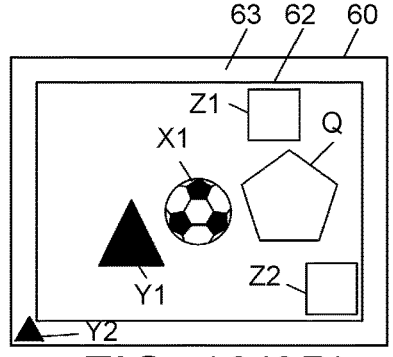
Figure 18:
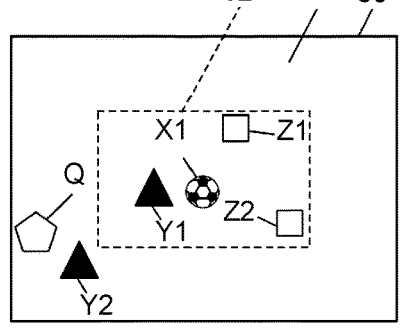
Figure 18:
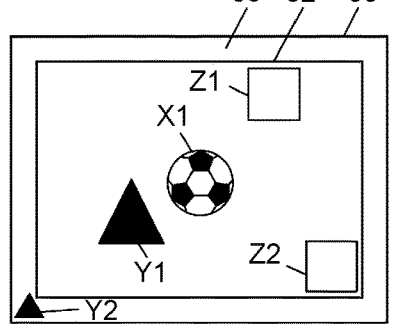

FIG. 18 (1A) to FIG. 18 (4B) illustrate an example of the input images 50 and the output images 60. FIG. 18 (1A) to FIG. 18 (4A) are the input images 50, and FIG. 18 (1B) to FIG. 18 (4B) are the output images 60 (clipped images 62 and the supplementary images 63). In the image map data table 821, the coordinate of the preset object is stored along with the frame numbers.

The input image 50 in FIG. 18 (2A) is input next to the input image 50 in FIG. 18 (1A).

As illustrated in FIG. 18 (2A), the input image 50 includes an object Q that is not included in the preset object information. When the image map generating section 172 detects an object that is not included in the preset object information in generating the edge map from the input image data, it stores the coordinate of the object in the storage 800 along with the frame number.

FIG. 18 (3A) is the input image 50 that is input next to the input image 50 in FIG. 18 (2A). Different from FIG. 18 (2A), the object Q is located approximately in the center of the input image 50 in FIG. 18 (3A). As illustrated in FIG. 18 (3B), the object Q is enlarged in the corresponding clipped image 62.

FIG. 18 (4A) is the input image 50 that is input next to the input image 50 in FIG. 18 (3A). Different from FIG. 18 (3A), the object Q is located in the lower left of the input image 50 in FIG. 18 (4A).

When there is no object information in FIG. 18 (2A) at the location corresponding to the coordinate of the object Q in FIG. 18 (3A), it is possible to avoid displaying the object Q in the clipped image 62 by replacing the pixels at the coordinate of the object Q in FIG. 18 (3A) with the pixels at the corresponding location in FIG. 18 (2A).

In addition to the image data of three frames (the target frame and the adjacent frames thereof), the image map generating section 172 may use the image data of more frames to make the above-described determination.

While there can be various types of unintentional objects, an insect or the like flying in the air is likely to appear as a black object since it is shaded. In addition to the above-described processing, the pixels of a target object may be replaced when it includes many black pixels.

In the above-described processing, when an unintentional object appears in an output frame, the pixels of the object are replaced with the pixels in the corresponding area in the previous or next frame, and the output frame with the replaced pixels is displayed on the display of the smartphone 2 as the output image. Instead, the entire frame including an unintentional object may be replaced with another frame within a predetermined range, e.g. the previous or next frame.

In the above-described present example and variations thereof, the imaging component 500 of the smartphone 2 is connected to the optical zooming component 550 by the joining component 520. However, it should be understood well by the skilled person in the art that the advantageous effects of the present disclosure can be sufficiently obtained even when no optical zooming component is connected.

3-4. Alignment of Camera Lens and Telephoto Lens

When attaching a telephoto lens to the camera (imaging component 500) of the smartphone 2, the user has to finely adjust the relative position between the telephoto lens and the camera of the smartphone 2 since the wide variety of the existing telephoto lenses and smartphones makes it difficult to establish a general attaching fashion. However, even when the user uses a device after he/she makes a fine adjustment and thinks the device is ready, a vignetting or a distortion can still appear in the image.

Conventionally, the power or the camera function of the smartphone 2 is typically off while the user is attaching a telephoto lens. In contrast, in the present example, the power and the camera function (imaging component 500) of the smartphone 2 is on while the user is attaching a telephoto lens.

Figure 19:
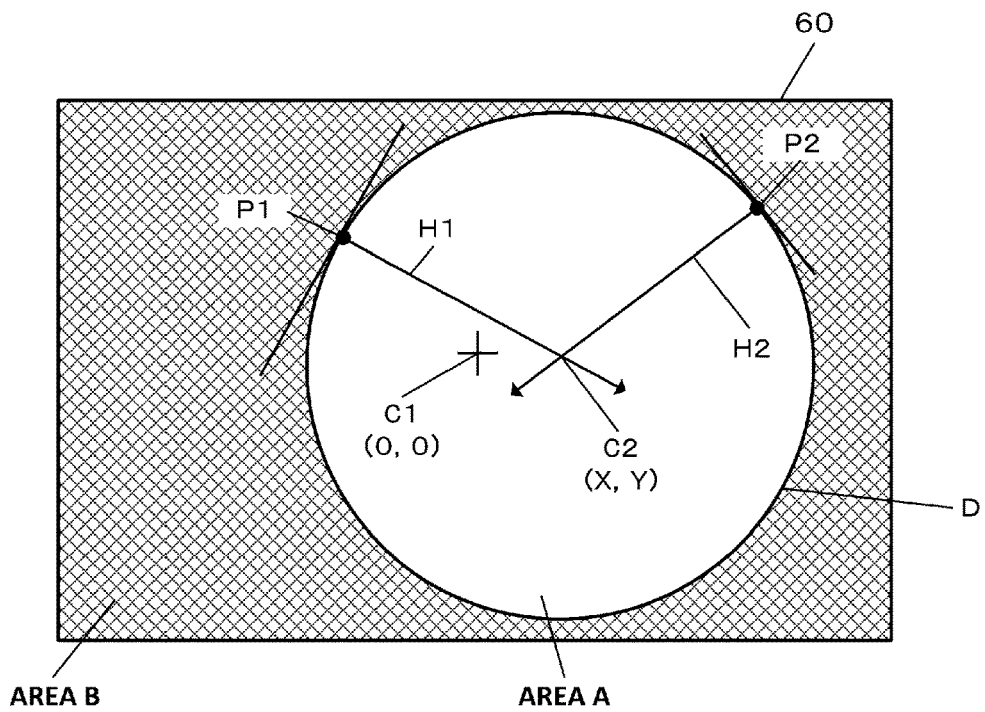
FIG. 19 (1A) and FIG. 19 (2A) illustrate an example of alignment of a camera lens and a telephoto lens.
Figure 19:
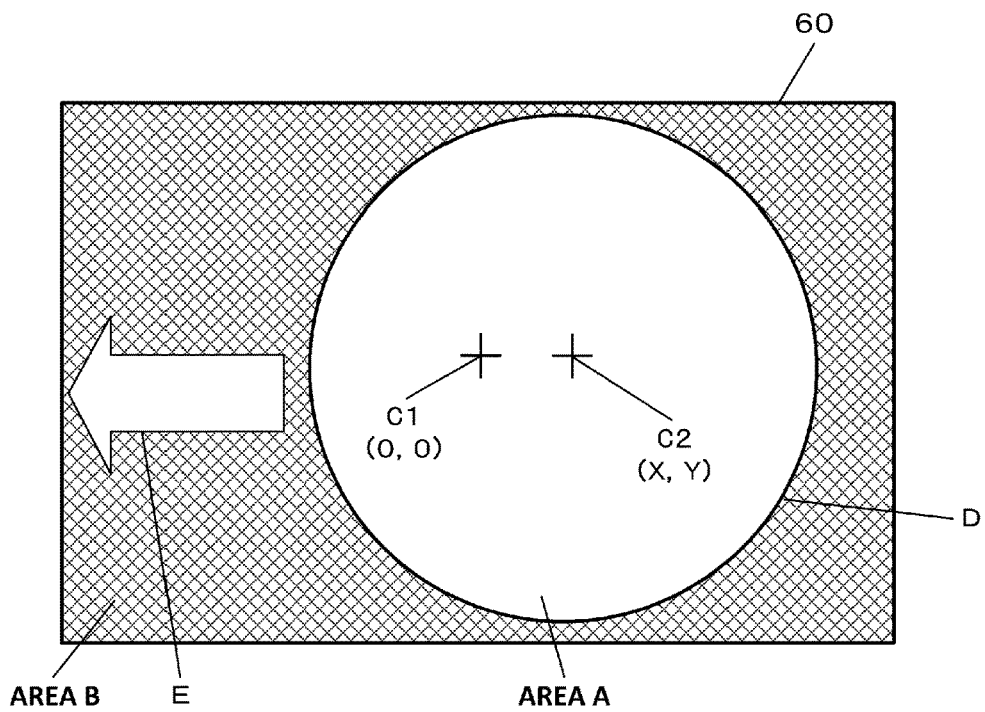

FIG. 19 (1A) and FIG. 19 (2A) illustrate an example of the alignment of the camera lens of the smartphone 2 and the telephoto lens. In the output image 60 on the display 300, the processing section 100 displays a mark (e.g. a plus symbol) indicating the center C1 (0, 0) of the lens of the camera of the smartphone 2 as well as the eyepiece (e.g. the eyecup of the eyepiece) of the telephoto lens photographed by the camera of the smartphone 2. The areas A and B in FIG. 19 (1A) and FIG. 19 (2A) denote respectively a telephoto lens area A and an eyepiece area B.

The processing section 100 calculates the center C2 (X, Y) of a circular portion D that is the boundary between the lens area A and the eyepiece area B (i.e. the center of the telephoto lens) and displays it in the display 300 of the smartphone 2. It is preferred that the mark indicating the center C2 is rendered in a color or figure different from the mark indicating the center C1. The user can visually check the position of the center C1 of the lens of the camera of the smartphone 2 and the center C2 of the circular portion D to understand the attachment error. Then, the user can finely adjust the attachment position so as to mount the telephoto lens in a correct position.

To calculate the center C2 (X, Y) of the telephoto lens, the processing section 100 performs an edge detection and a subsequent Hough transformation on the circular portion D to obtain a circle and randomly selects two points on the circle. Then, the processing section 100 calculates the coordinate of the intersection of the two normal vectors from the selected two points. The processing section 100 repeats this to obtain multiple intersections and then calculate the center coordinate of the multiple intersections as the center C2 (X, Y) of the telephoto lens. Instead of the Hough transformation, the user may be asked to select two points on the circumference of the circular portion D, e.g. points P1, P2 in FIG. 19 (1A) through a tap operation or the like, and the intersection of the normal vectors H1, H2 from the points P1, P2 may be set as the center C2 (X, Y) of the telephoto lens. This can reduce the data processing load. Further, this can also prevent a processing error since the points are not randomly selected by the processing section 100 but correctly selected by the user.

The processing section 100 calculates the deviation of the calculated center C2 (X, Y) of the telephoto lens from the center C1 (0, 0) of the lens of the camera of the smartphone 2 and displays, for example, an arrow E as illustrated in FIG. 19 (2A) that points the direction from the center C2 of the telephoto lens to the center C1 of the lens of the camera of the smartphone 2. Even when the calculated center C2 (X, Y) of the telephoto lens is located outside the output image 60, the processing section 100 may display the arrow E in the output image 60 to prompt the user to perform the alignment.

Figure 20:
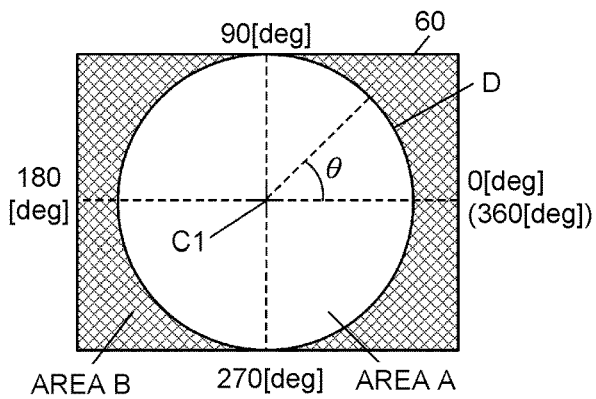
FIG. 20 (1A) to FIG. 20 (4B) are images and graphs illustrating an example of alignment of a camera lens and a telephoto lens.
Figure 20:
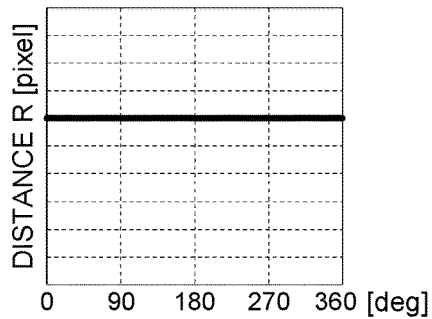
Figure 20:
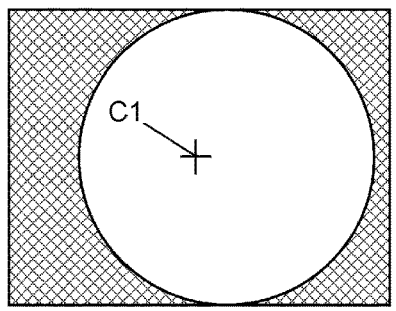
Figure 20:
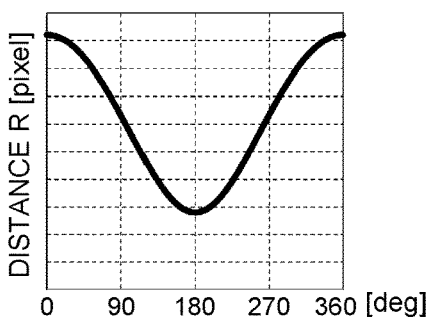
Figure 20:
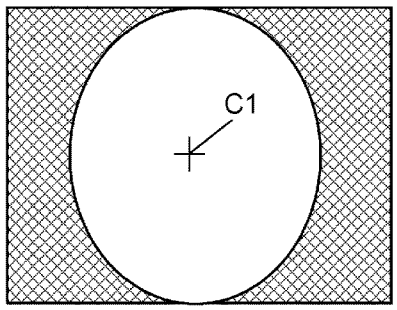
Figure 20:
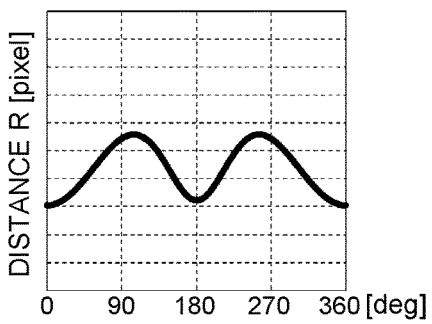
Figure 20:
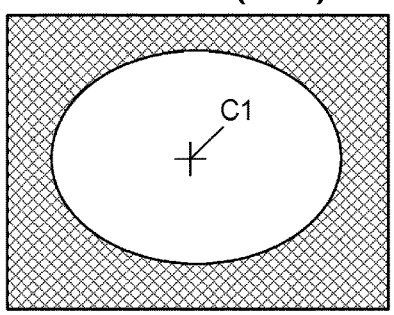
Figure 20:
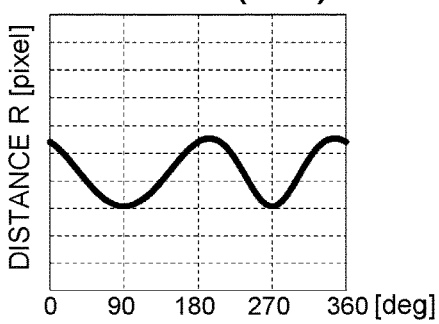

FIG. 20 (1A) to FIG. 20 (4B) are images and graphs of an example of the alignment of the camera lens of the smartphone 2 and the telephoto lens.

As illustrated in FIG. 20 (1A) to FIG. 20 (4A), the lens area A of the telephoto lens, the eyepiece area B of the telephoto lens, the circular portion D that is the boundary between the lens area A and the eyepiece area B, and the center C1 of the lens of the camera of the smartphone 2 are displayed on the display 300. The circular portion D may be illustrated as a circle obtained by Hough transformation.

FIG. 20 (1B) to FIG. 20 (4B) are graphs plotting the distance R from the center C1 of the lens of the camera of the smartphone 2 to the circumference of the circular portion D on the vertical axis against the center angle (0° to 360°) of the circular portion D on the horizontal axis. In the graph in FIG. 20 (1B), the distance R is constant at an angle from 0° to 360°. This shows that the center C2 of the telephoto lens is coincide with the center C1 of the lens of the camera of the smartphone 2. In this case, it is desirable to display a message "lens position OK" or the like on the display of the smartphone 2.

In FIG. 20 (2A), the center of the circular portion D is deviated to the right with respect to the center C1. The graph in FIG. 20 (2B) has an approximately hyperbolic shape with the minimal point at 180°. This shows that the center C2 of the telephoto lens is misaligned with the center C1 of the lens of the camera of the smartphone 2. Specifically, the attached telephoto lens is offset to the right. In this case, it is desirable to display a message "The telephoto lens is deviated to the right. Please adjust it." or the like on the display of the smartphone 2.

In FIG. 20 (3A), the circular portion D is displayed as a vertically-long ellipse. The graph in FIG. 20 (3B) has peaks approximately at 100° and 250° and a valley at 180°. This shows that the center C2 of the telephoto lens is coincide with the center C1 of the lens of the camera of the smartphone 2, but the telephoto lens is inclined about the yaw axis. In this case, it is desirable to display a message "The telephoto lens is inclined about the yaw axis. Please adjust it." or the like on the display of the smartphone 2.

In FIG. 20 (4A), the circular portion D is displayed as a horizontally-long ellipse. The graph in FIG. 20 (4B) has valleys approximately at 90° and 270° and a peak at 200°. Further, the valley at 90° is steeper than the valley at 270°. This shows that the center C2 of the telephoto lens is coincide with the center C1 of the lens of the camera of the smartphone 2, but the telephoto lens is inclined about the pitch axis. In this case, it is desirable to display a message "The telephoto lens is inclined about the pitch axis. Please adjust it" or the like on the display of the smartphone 2.

In the above description, the adjustment in attaching the telephoto lens to the camera lens of the smartphone 2 is described. It is also possible to correct the distortion of the input image 50 (optical output image) by using the data as illustrated in FIG. 20 (1A) to FIG. 20 (4B). When the telephoto lens is correctly attached to the camera of the smartphone 2 without deviation, the input image 50 does not have any distortion. That is, the center C1 of the lens of the camera of the smartphone 2 is coincide with the center C2 of the telephoto lens, the distance R from the center C1 to the circumference of the circular portion D is uniform, and the circle with a radius of the distance R is a true circle as illustrated in FIG. 20 (1A) and FIG. 20 (1B). In contrast, when the attached telephoto lens is deviated with respect to the camera of the smartphone 2, the input image 50 is distorted, and the circle with a radius of the distance R is a vertically-long ellipse as illustrated in FIG. 20 (4A) and FIG.

20 (4B). To correct such distortion of the input image, the processing section 100 may calculate a transformation matrix that represents the relationship of five points of the ideal true circle, e.g. the upper, lower, right and left points on the circle and the center point, with the corresponding points of a distorted ellipse, and perform the correction processing with the calculated transformation matrix.

3-5. Imaging Cancellation

When the user captures an image of an outdoor scene by using a telephoto lens (optical zooming component 24, 550) attached on a terminal (image processing device 1, smartphone 2), he/she may sometimes erroneously aim the telephoto lens at the sun. In such cases, the enlarged clipped image 62 may damage the visual system of the user who views it. To reduce the risk, a display control section (display control section 20, 180) performs imaging cancellation processing that prevents the sun from being included in the clipped image 62.

The GPS part of the terminal (image processing device 1 or smartphone 2) receives RF signals including a GPS satellite signal, which is a kind of positioning satellite signals, transmitted from a GPS satellite, which is a kind of positioning satellites. Then, the GPS part captures the GPS satellite signal from the received RF signals, perform GPS calculation known in the art to calculate the three-dimensional location information and the time error information of the terminal from the captured GPS satellite signal.

Further, the gyroscope sensor (motion sensor 25, 760) of the terminal detects the three-dimensional angular velocity (angular velocities about three axes) in the local coordinate system related to the terminal.

Figure 21:
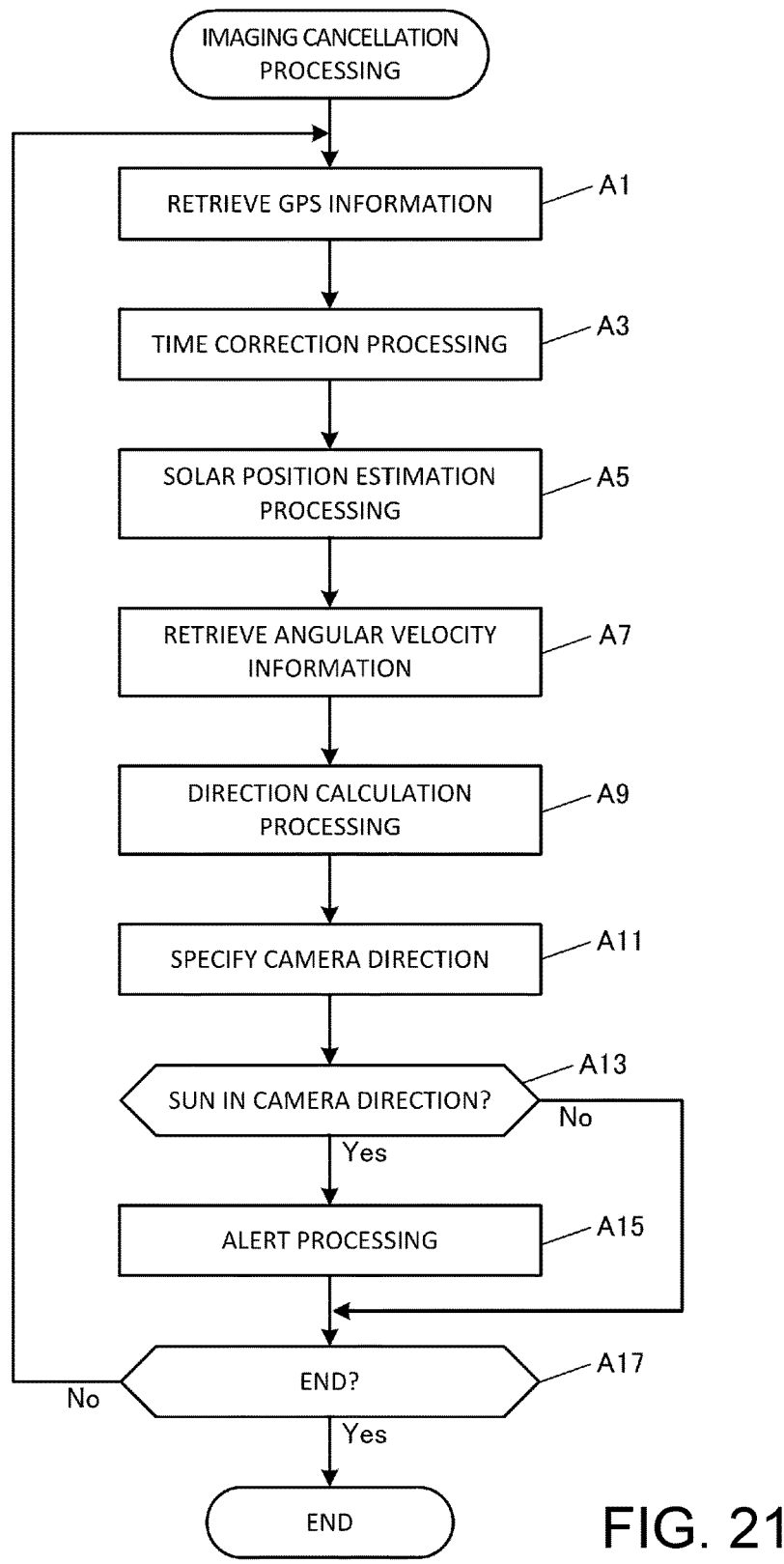
FIG. 21 is a flowchart illustrating an example of the flow of imaging cancellation processing.

FIG. 21 is a flowchart illustrating an example of the flow of exception processing that is performed by the display control section 180 of the smartphone 2.

First, the display control section 180 retrieves GPS information including the location information and the time error information of the terminal from the GPS part (A1). Then, the processing section performs time correction processing (A3). Specifically, the processing section corrects the time counted in the clock of the terminal based on the time error information of the GPS information retrieved in Step A1.

Then, the display control section 180 performs solar position estimation processing (A5). Specifically, the display control section estimates the relative solar position with respect to the position of the terminal retrieved in Step A1 from the time counted in the clock, which has been corrected in Step A3 by the time correction processing. The solar position estimation processing can also be regarded as processing to estimate the relative positional relationship between the terminal and the sun (relative positional relationship estimation processing).

Thereafter, the display control section 180 retrieves the angular velocity information from the motion sensor 760 (A7). Then, the display control section 180 performs direction calculation processing (A9). Specifically, the display control section 180 performs integration processing (integration and accumulation) on the three-dimensional angular velocity of the angular velocity information retrieved in Step A7 to calculate the directional angle (direction) of the terminal. Then, the display control section 180 specifies the current pointing direction of the terminal as the photographing direction (viewing direction) based on the calculated directional angle (A11).

Thereafter, based on the solar position estimated in Step S5, the display control section 180 makes a determination as to whether the sun is in the photographing direction calculated in Step A11 (A13). When it is determined that the sun is in the photographing direction (A13, Yes), the display control section 180 performs alert processing (A15). Specifically, for example, the display control section 180 warns the user by displaying a message on the display 300 that informs the user of the portable terminal being pointed toward the sun or that prompts the user to change the direction of the portable terminal to deviate it from the sun or by making an alert sound by means of the sound output component 400.

After Step A15 or when it is determined in Step A13 that the sun is not in the photographing direction (A13, No), the display control section 180 makes a determination as to whether to terminate the processing (A17). When it is determined to continue the processing (A17, No), the processing returns to Step A1. When it is determined to terminate the processing (A17, Yes), the imaging cancellation processing ends.

The GPS part may calculate either three-dimensional location information or two-dimensional location information composed of the latitude and the longitude.

In the direction calculation processing, an acceleration sensor or a magnetic sensor may be used to calculate the direction of the terminal. For example, a combination of a triaxial acceleration sensor and a triaxial magnetic sensor may be used to calculate the inclination and the bearing of the terminal so as to calculate the direction of the terminal. It is possible to put sensors such as an acceleration sensor, a gyroscope sensor and a magnetic sensor into a single sensor part package called inertial measurement unit (IMU) and to install it in the portable terminal.

Instead of using a satellite positioning system such as the GPS to calculate the location of the terminal, an inertial navigation system (INS) including an inertial measurement unit (IMU) may be used to calculate the location of the terminal. Further, the terminal may be configured to use at least one of the satellite positioning system and the inertial navigation system to calculate the location of the terminal. Specifically, for example, average processing may be performed to calculate the average (e.g. arithmetic average or weighted average) of the locations respectively determined by means of the satellite positioning system and the inertial navigation system so as to calculate the location of the terminal.

Even when the user is given an alert not to point the telephoto lens toward the sun, there is still a probability that he/she erroneously points the telephoto lens toward the sun. To reduce the harmfulness of such user actions, the brightness of the image of the sun may be decreased when the sun is not shown in the clipped image 62 (clipped data area 52) yet but is already included in the supplementary image 63 (non-clipped data area 53). Specifically, when there is a pixel having a brightness of a threshold or more (or greater than the threshold) in the supplementary image 63 (non-clipped data area 53), the display control section 180 may decrease the brightness of the image area of a high-brightness object, for example, by automatically reducing the brightness of the pixel. That is, a brightness filter is applied to the supplementary image 63 (non-clipped data area 53) so that a high-brightness object such as the sun is prevented from being directly shown in the clipped image 62. This processing to decrease the brightness may also be performed on the clipped data area 52 as well as the non-clipped data area 53.

Since the direction of the device can be calculated from the output of a gyroscope sensor or the like, the perspective of the photographed input image 50 or the clipped image 62 may be corrected based on the calculated direction of the device. For example, a photographed image (input image 50 or clipped image 62) of a subject captured in an overlooking angle from a high floor of a building is stored in the storage 800 along with the photographing direction which is the direction of the device when the image is captured. Then, the device calculates a transformation matrix that relates the photographing direction to the prestored direction of the device in which the lens of the imaging component 500 is horizontal, and coverts the photographed image using the calculated transformation matrix so as to obtain a corrected image that simulates the front view of the subject.

Detection Frame of Object Detection

When an object is detected, a detection frame enclosing the object such as a rectangle may be displayed for improving the visibility. In this case, it is effective that detection frames are rendered in different colors according to the detected persons or teams. While a ball is selected as a selected subject in the above description, a certain player may be selected instead. The frame enclosing the selected subject may be rendered in a different color from the other frames so that the selected subject is more distinguishable.

In the above-described present example, the smartphone 2 is held in the hand. However, it should be understood well that the present disclosure is similarly applicable to the case in which the smartphone 2 is connected to a photography assist equipment, and the user operates the photography assist equipment with a remote controller or the like to parallelly shift or rotate the smartphone 2 when viewing or photographing an enlarged image. That is, it should be understood well that the movement of the smartphone 2 can be determined by the motion determining section 171 in the same manner as when it is held in the hand, and the digital zoom control, the blur correction and the like can be performed according to the determination result.

In the above-described present example, the notifications such as the operation guides for the user are made by displaying a figure or text information on the display 300. However, the notifying means is not limited thereto and may be sound, light, vibration or a combination thereof.

It is possible to produce a non-transitory computer-readable medium storing a program that makes a computer perform the image processing and the display control described in the above-described embodiment and the present example. Such computer-readable media include a variety of magnetic disks, optical disks, magnetooptical disks, flash memories and the like.

Figure 22:
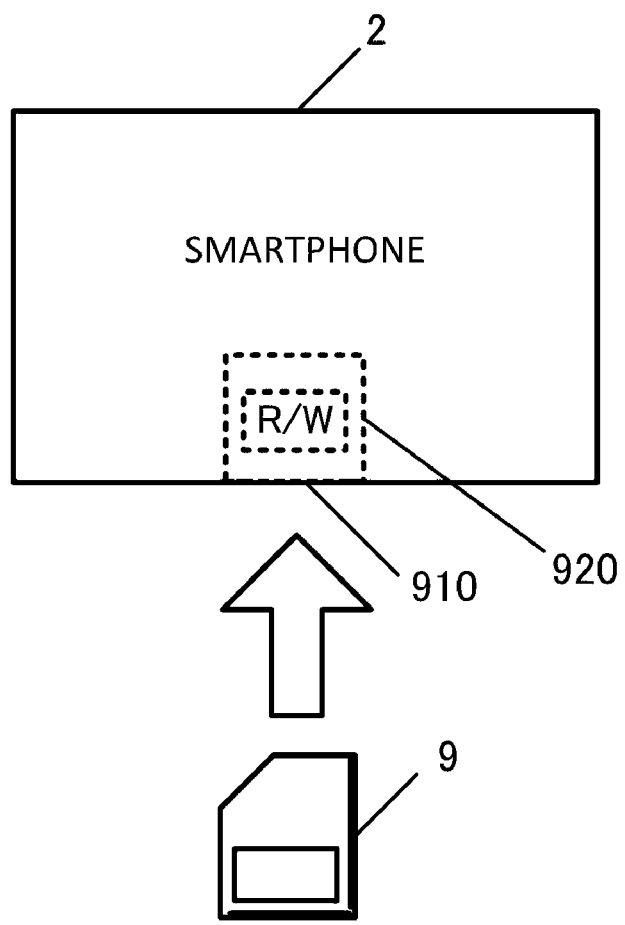
FIG. 22 illustrates an example of a computer-readable medium.

FIG. 22 illustrates an example of the recording medium.

The smartphone 2 includes a card slot 910 to which a memory card 9 is inserted and a card reader/writer (R/W) 920 to read/write information from/to the memory card 9 inserted in the card slot 910. The card reader/writer 920 writes the programs and data stored in the storage 800 to the memory card 9 by a control of the processing section 100. Further, the programs and data stored in the memory card 9 are configured such that an external device (e.g. personal computer) other than the smartphone 2 can read the programs and data to perform the image processing and the display control in the above-described embodiment in the own device.

Satellite Positioning System

In the above-described embodiment, the GPS is used as the satellite positioning system. Instead, other satellite positioning systems such as the WAA (wide area augmentation system), the QZSS (quasi zenith satellite system), the GLONASS (global navigation satellite system) and the GALILEO may also be used.

The invention claimed is:

1. An image processing device, comprising:
a display;
an input part to which an image is input; and
a hardware processor configured to implement:
a specified area setting part configured to set a specified area in the input image;
a display control part configured to display the specified area on the display;
an additional information setting part configured to set additional information on at least a part of a non-specified area that is an area other than the specified area of the input image; and
an additional information display control part configured to display the additional information on the display,
wherein the specified area setting part updates the specified area corresponding to an update of the input image, and
the additional information setting part updates the additional information corresponding to the update of the input image, wherein the additional information comprises information on an object in the non-specified area, and the additional information display control part makes a determination as to whether to display the additional information of the object on the display based on a distance from a location of the object to the specified area.

2. The image processing device according to claim 1, wherein the additional information display control part displays the additional information on the display in such a manner that reflects a positional relationship between the additional information and the specified area.

3. The image processing device according to claim 1, wherein the additional information comprises information on a location of the object.

4. The image processing device according to claim 1, wherein the object matches a preset characteristic.

5. The image processing device according to claim 1, wherein the object is selected by a user or matches a characteristic set by the user.

6. The image processing device according to claim 1, wherein the additional information display control part displays the additional information outside a display area of the specified area on the display.

7. The image processing device according to claim 1, wherein the additional information comprises a deformed image of the non-specified area.

8. The image processing device according to claim 7, wherein the additional information comprises an image of the non-specified area that is deformed according to a distance to the specified area.

9. The image processing device according to claim 1, wherein the specified area setting part updates the specified area in a shorter cycle than the additional information setting part updating the additional information.

10. The image processing device according to claim 1, wherein the specified area setting part sets the specified area so that a target object is included in the specified area, in which the target object is selected by a user or matches a condition set by the user.

11. An image processing device, comprising:
a display;
an input part to which an image is input; and
a hardware processor configured to implement:
a specified area setting part configured to set a specified area in the input image;
a display control part configured to display the specified area on the display;

an additional information setting part configured to set additional information on at least a part of a non-specified area that is an area other than the specified area of the input image; and an additional information display control part configured to display the additional information on the display, wherein the specified area setting part updates the specified area corresponding to an update of the input image, and the additional information setting part updates the additional information corresponding to the update of the input image, wherein when the additional information is selected according to a user input, the specified area setting part sets the specified area so that a corresponding object of the additional information is included in the specified area.

12. The image processing device according to claim 10, wherein the specified area setting part updates the specified area corresponding to the update of the input image so that the target object is included in the specified area.

13. The image processing device according to claim 12, wherein the specified area setting part changes a magnification of the specified area corresponding to the update of the input image so that the target object is included in the specified area.

14. The image processing device according to claim 10, wherein hardware the processor is further configured to implement:

an imaging part; and a notification part configured to prompt the user to change a photographing direction of the imaging part such that the specified area including the target object gets close to a center of the input image.

15. The image processing device according to claim 10, wherein the hardware processor further configured to implement: an information display control part configured to display a notification of the target object being not included in the input image on the display when the target object gets out of the input image.

16. The image processing device according to claim 1, wherein the hardware processor further configured to implement: a brightness adjusting part configured to adjust a brightness of the input image when the input image includes an object that meets a predetermined brightness condition.

17. An image processing method for performing image processing, comprising:

an input step of inputting an image;

a specified area setting step of setting a specified area in the input image;

a display control step of displaying the specified area on a display;

an additional information setting step of setting additional information on at least a part of a non-specified area that is an area other than the specified area of the input image; and an additional information display control step of displaying the additional information on the display, wherein the specified area setting step comprises updating the specified area corresponding to an update of the input image, and the additional information setting step comprises updating the additional information corresponding to the update of the input image, wherein the additional information comprises information on an object in the non-specified area, and the additional information display control part makes a determination as to whether to display the additional information of the object on the display based on a distance from a location of the object to the specified area.

18. A non-transitory computer-readable medium storing a program that makes a computer perform image processing that comprises:

an input step of inputting an image;

a specified area setting step of setting a specified area in the input image;

a display control step of displaying the specified area on a display;

an additional information setting step of setting additional information on at least a part of a non-specified area that is an area other than the specified area of the input image; and an additional information display control step of displaying the additional information on the display, wherein the specified area setting step comprises updating the specified area corresponding to an update of the input image, and the additional information setting step comprises updating the additional information corresponding to the update of the input image, wherein the additional information comprises information on an object in the non-specified area, and the additional information display control part makes a determination as to whether to display the additional information of the object on the display based on a distance from a location of the object to the specified area.

19. An image processing method for performing image processing, comprising:

an input step of inputting an image;

a specified area setting step of setting a specified area in the input image;

a display control step of displaying the specified area on a display;

an additional information setting step of setting additional information on at least a part of a non-specified area that is an area other than the specified area of the input image; and an additional information display control step of displaying the additional information on the display, wherein the specified area setting step comprises updating the specified area corresponding to an update of the input image, and the additional information setting step comprises updating the additional information corresponding to the update of the input image, wherein when the additional information is selected according to a user input, the specified area setting part sets the specified area so that a corresponding object of the additional information is included in the specified area.

20. A non-transitory computer-readable medium storing a program that makes a computer perform image processing that comprises:

an input step of inputting an image;

a specified area setting step of setting a specified area in the input image;

a display control step of displaying the specified area on a display;

an additional information setting step of setting additional information on at least a part of a non-specified area that is an area other than the specified area of the input image; and an additional information display control step of displaying the additional information on the display, wherein the specified area setting step comprises updating the specified area corresponding to an update of the input image, and the additional information setting step comprises updating the additional information corresponding to the update of the input image, wherein when the additional information is selected according to a user input, the specified area setting part sets the specified area so that a corresponding object of the additional information is included in the specified area.

* * * * *